Aug. 18, 1931.  C. BARBIERI  1,819,318
CUP MACHINE
Filed April 30, 1928   17 Sheets-Sheet 13
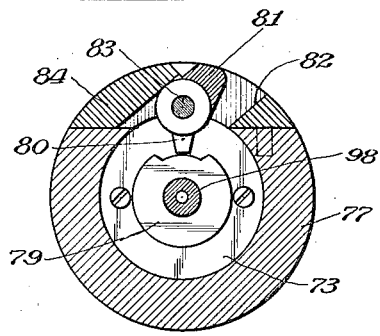
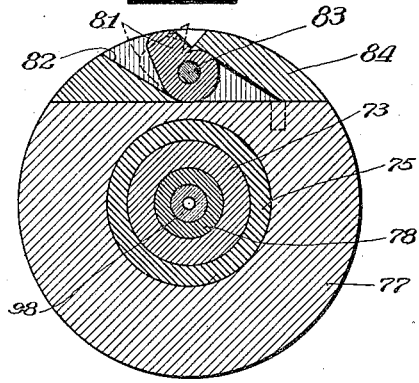
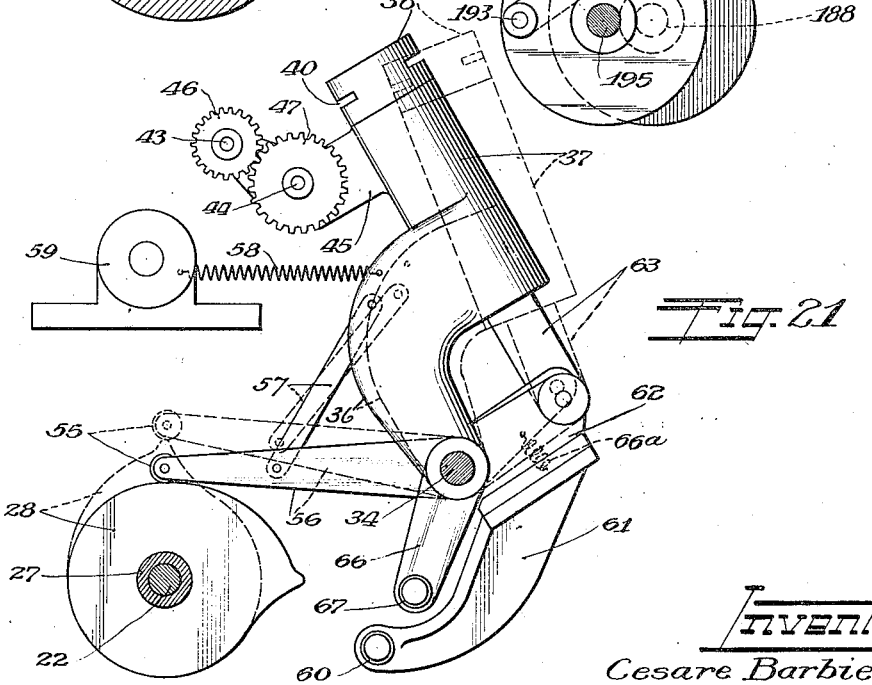
Inventor:
Cesare Barbieri.
by Charles T. Hills
Attys.

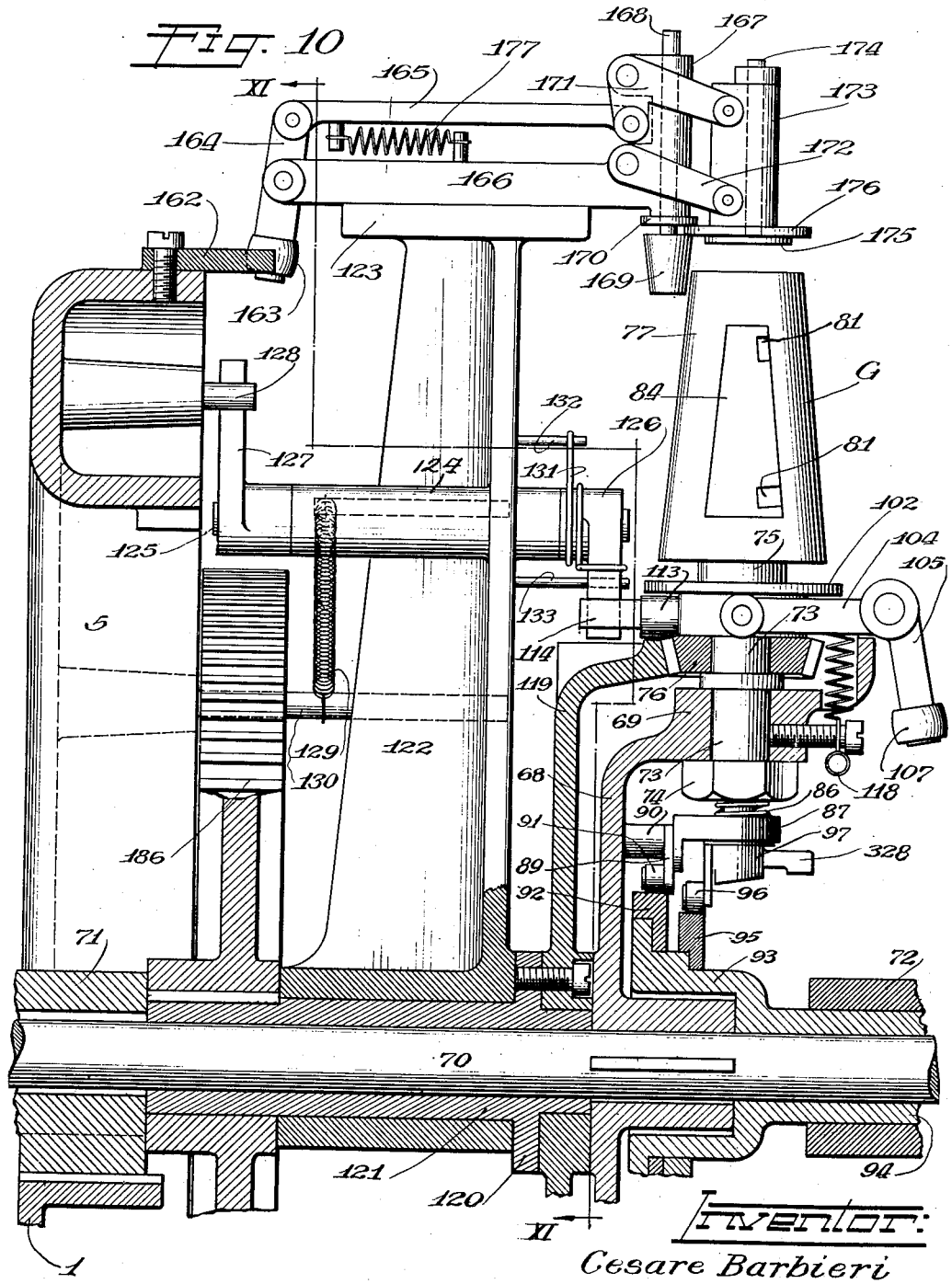

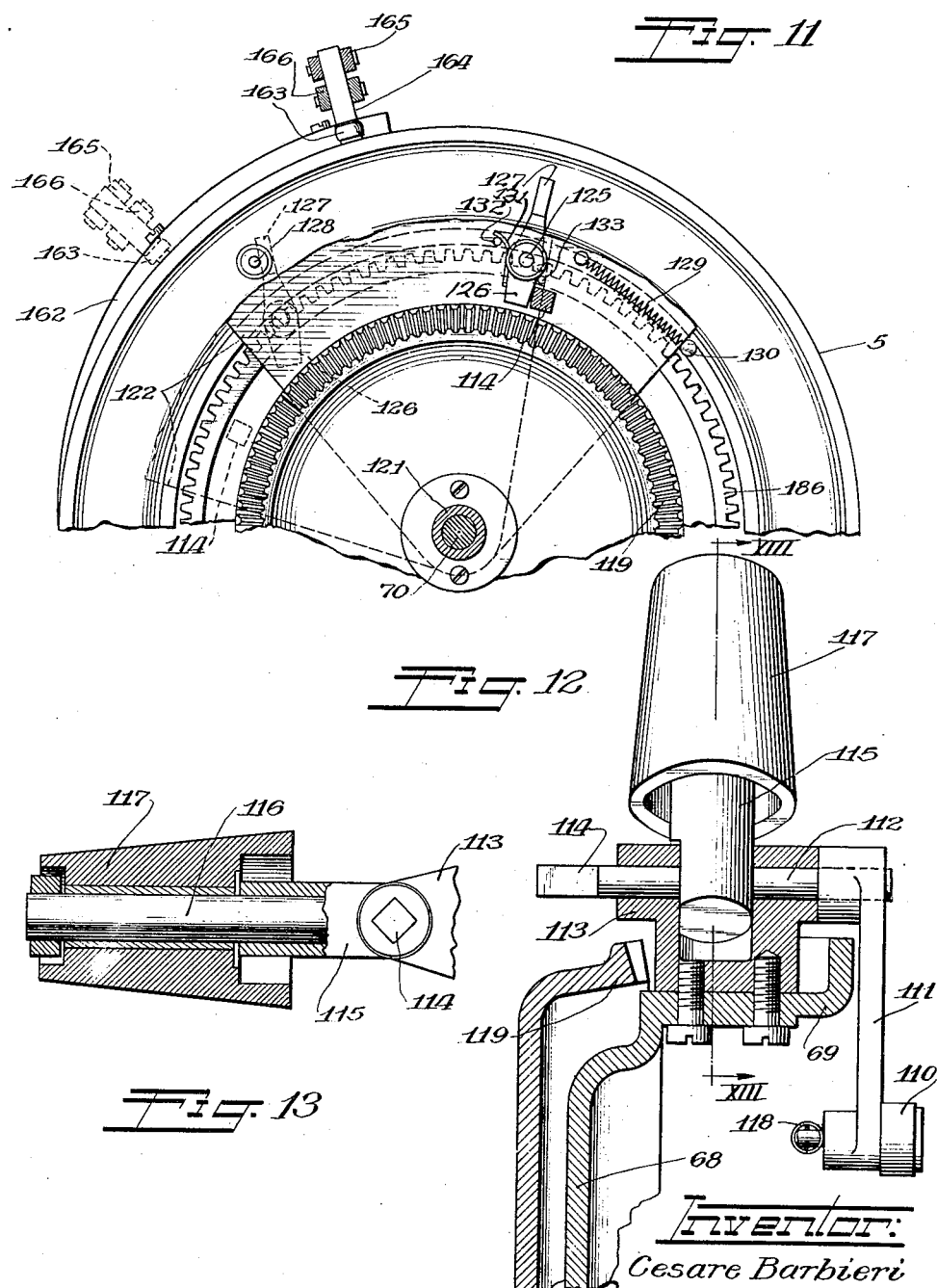

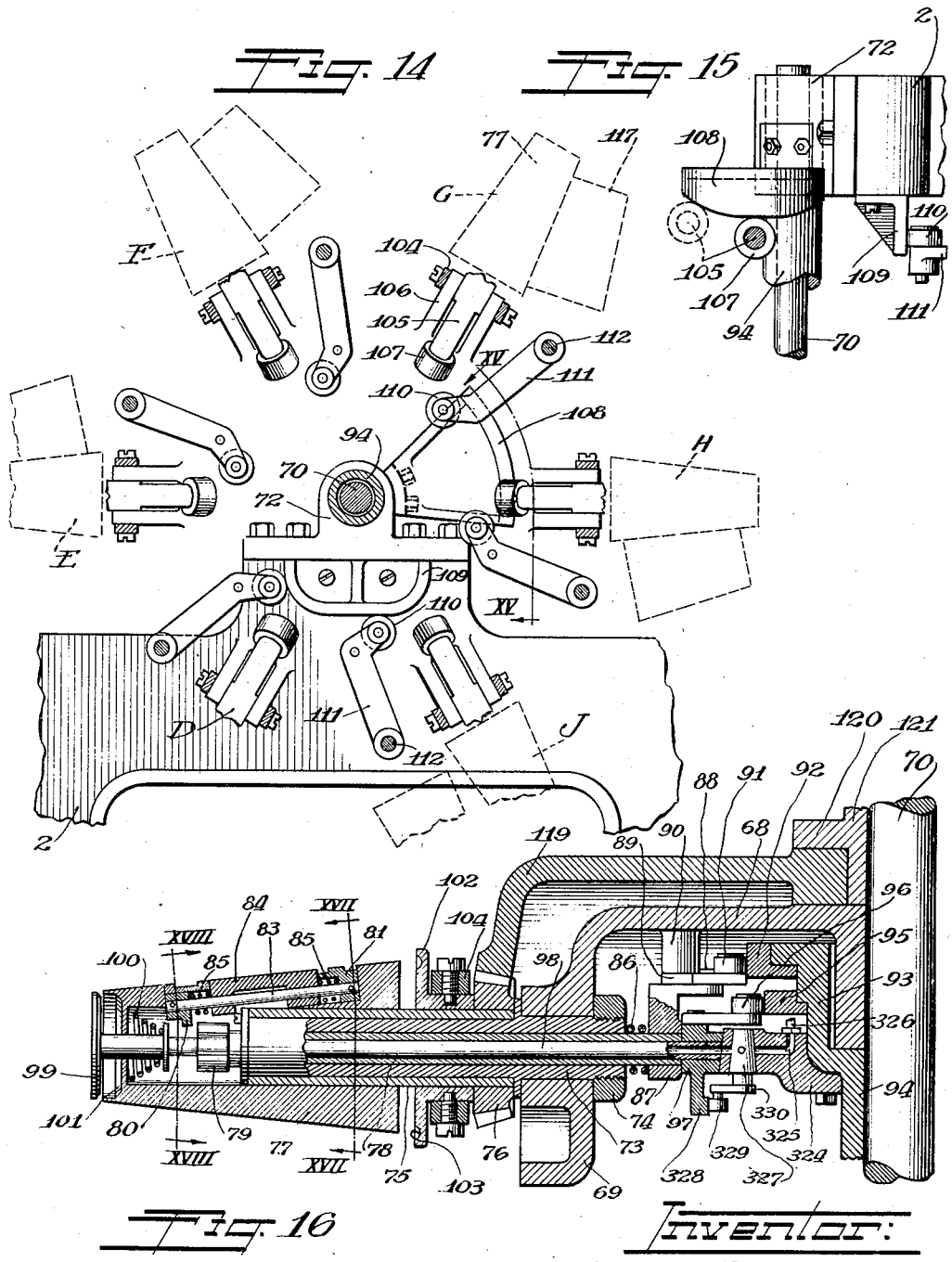

Aug. 18, 1931.  C. BARBIERI  1,819,318
CUP MACHINE
Filed April 30, 1928   17 Sheets-Sheet 14
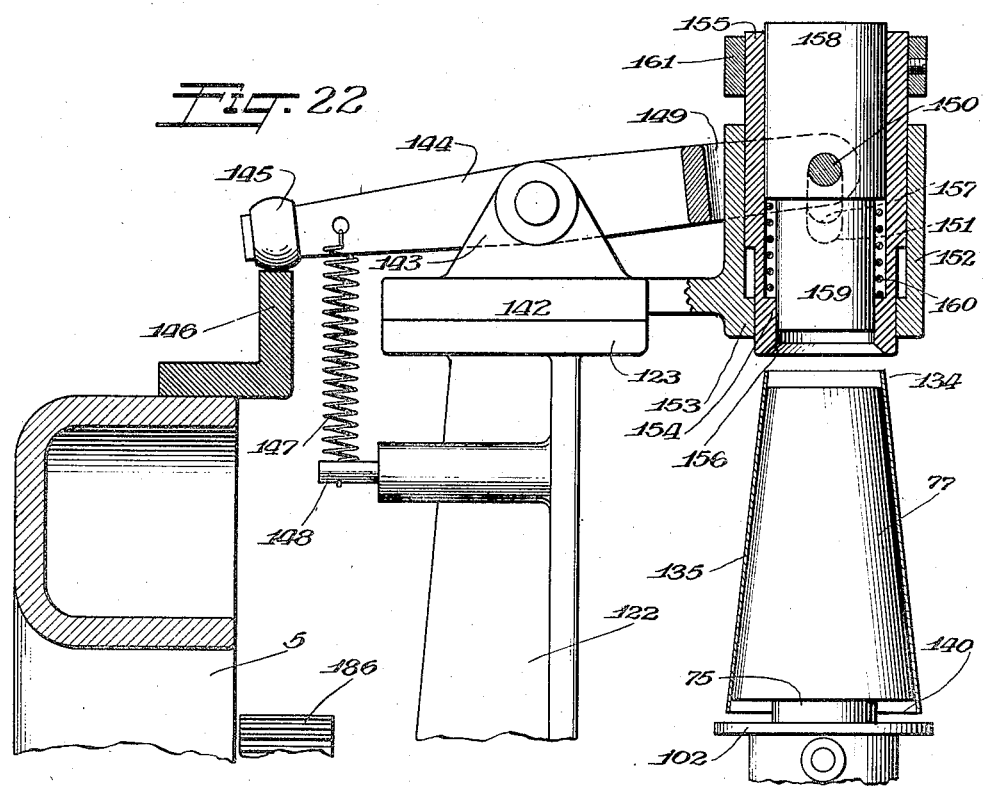
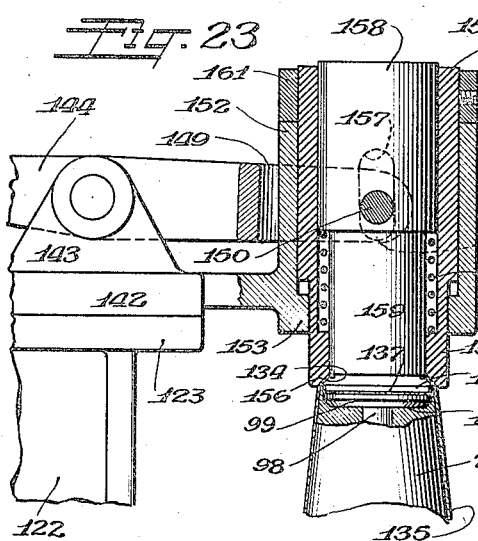
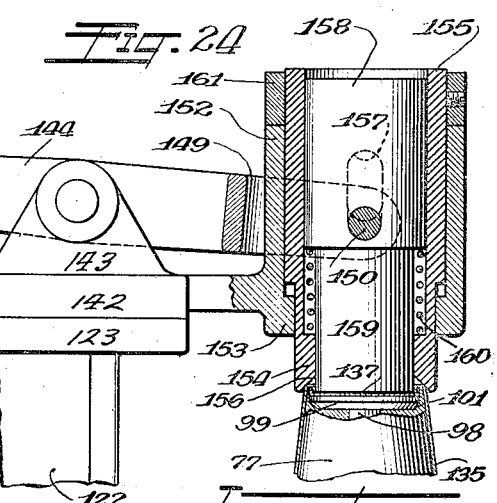
Inventor:
Cesare Barbieri
by: Charles T. Wills
Attys.

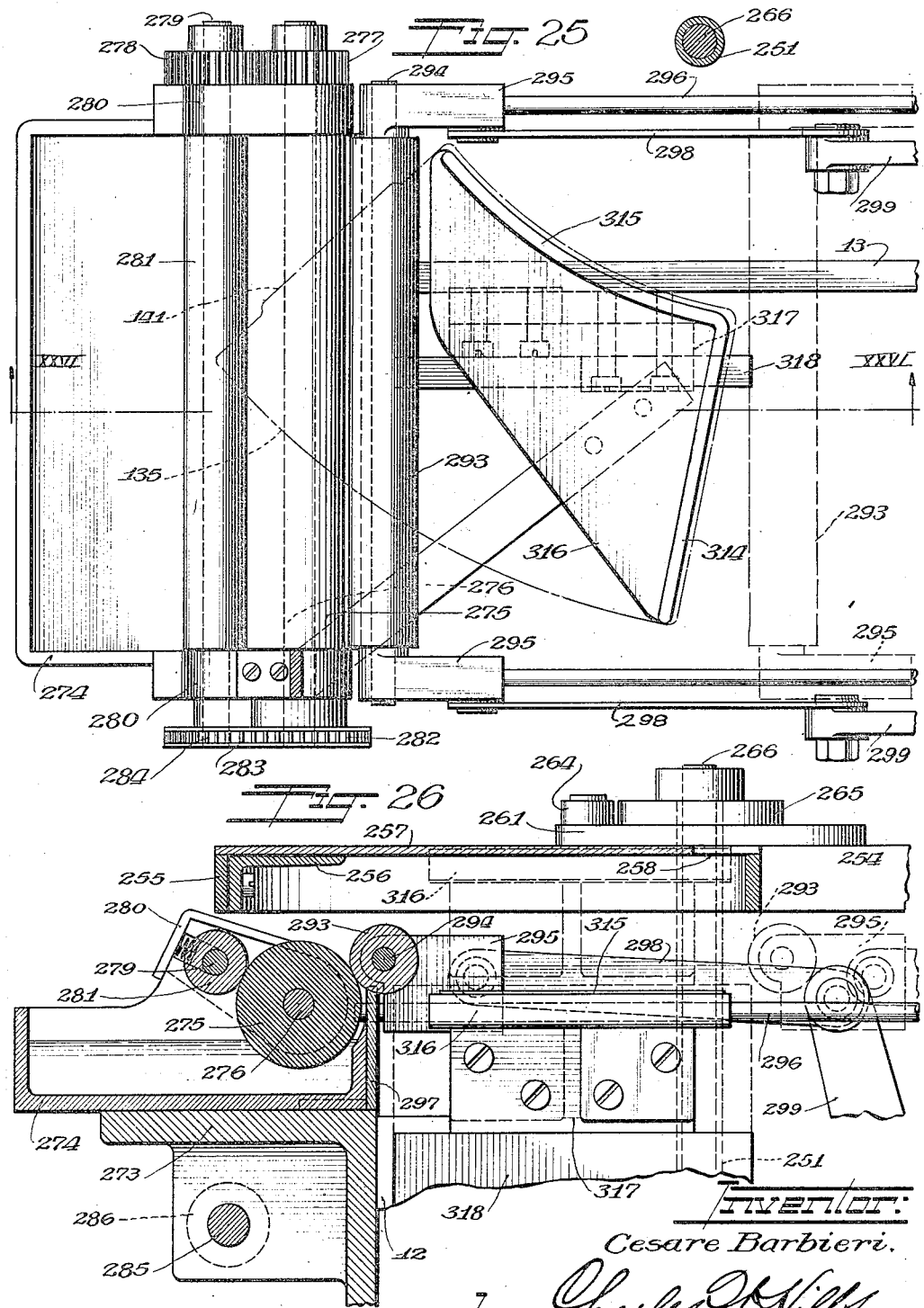

Aug. 18, 1931.  C. BARBIERI  1,819,318
CUP MACHINE
Filed April 30, 1928  17 Sheets-Sheet 16
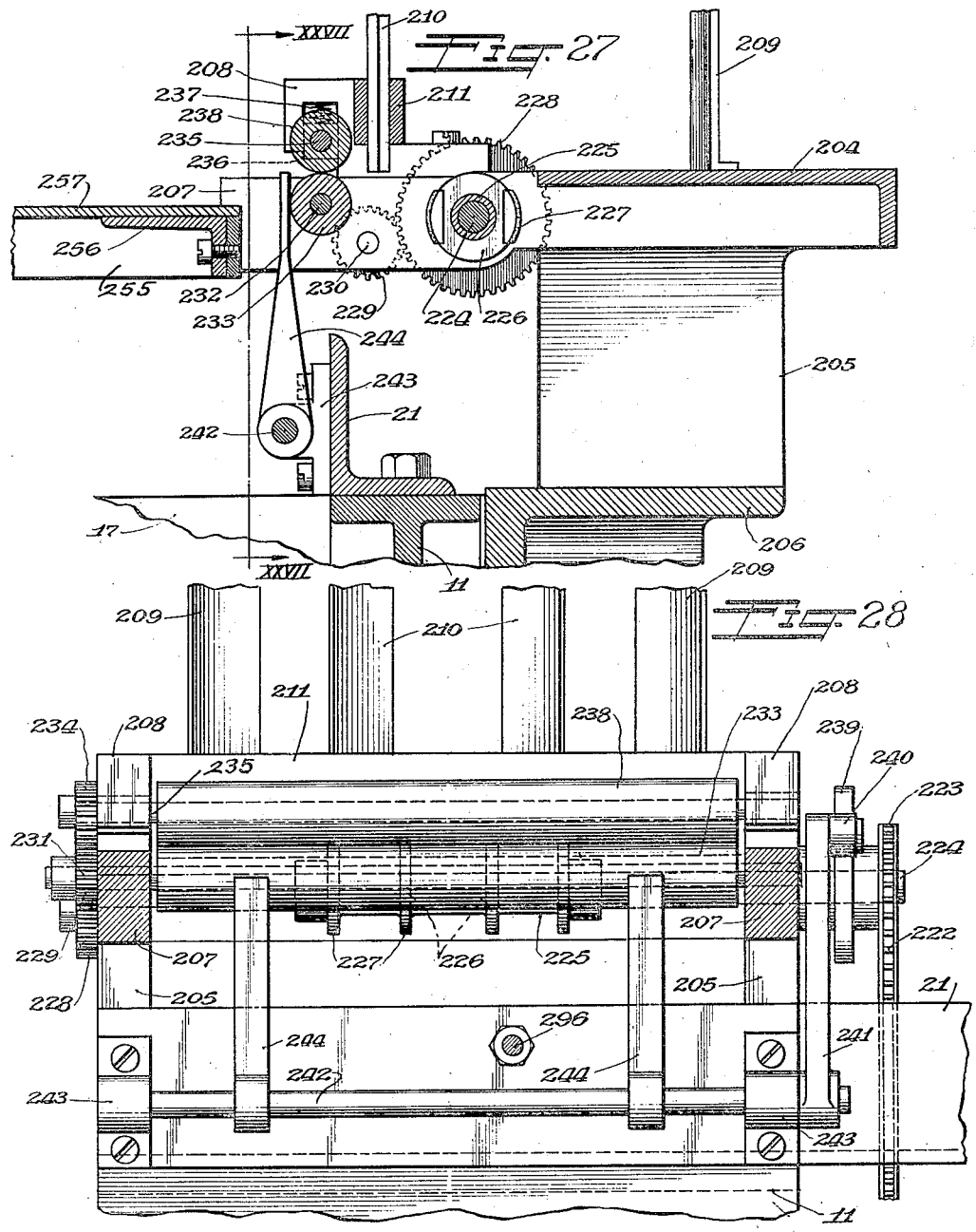
Inventor:
Cesare Barbieri
By: Charles O'Neill
Attys.

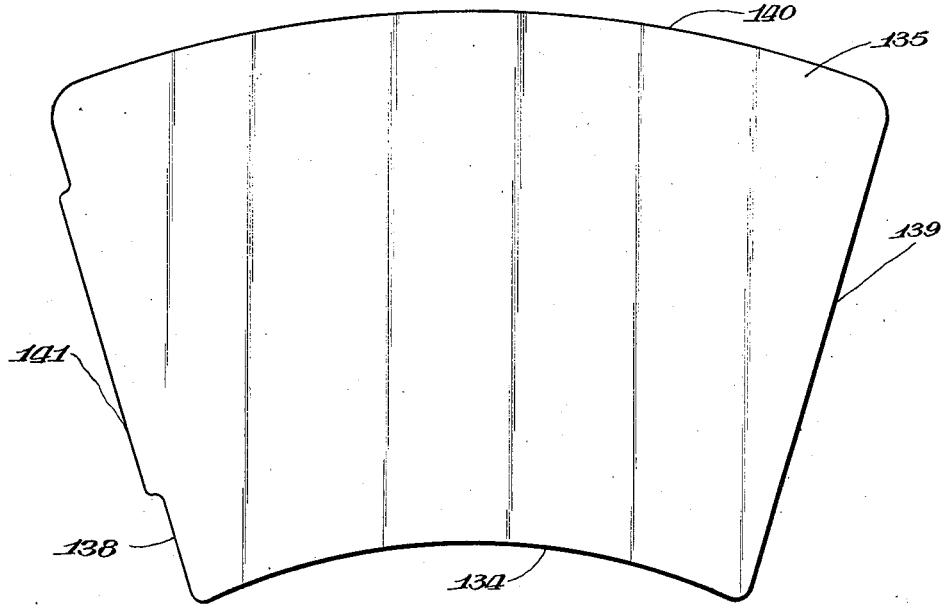
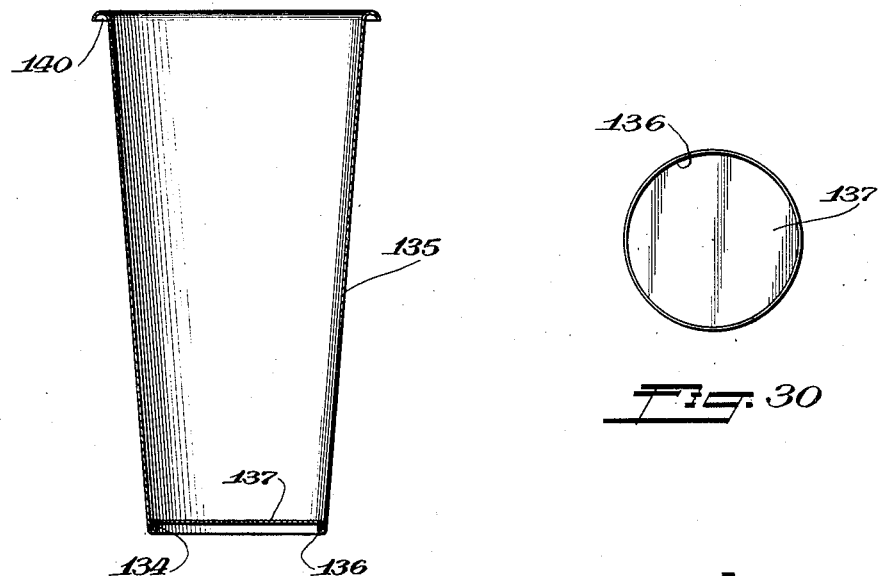

Patented Aug. 18, 1931

1,819,318

UNITED STATES PATENT OFFICE

CESARE BARBIERI, OF NEW YORK, N. Y., ASSIGNOR, BY MESNE ASSIGNMENTS, TO VORTEX CUP COMPANY, OF CHICAGO, ILLINOIS, A CORPORATION OF DELAWARE

CUP MACHINE

Application filed April 30, 1928. Serial No. 273,970.

This invention relates to a flat bottom cup making machine and more particularly to an improved machine for automatically producing flat bottom paper cups from a plurality of properly shaped glued blanks fed through the machine by improved feeding mechanisms into the field of operation of rotary formers to be formed into cups.

It is an object of this invention to provide a rotary type of a flat bottom cup making machine having a rotary type of blank transfer feed mechanism for transferring cup body blanks from a magazine to a glueing mechanism and then to rotary formers to which cup bottom blanks, formed in the machine, are also fed.

It is also an object of the invention to provide a machine adapted to automatically punch out and form cup bottom blanks and feed and glue cup body blanks, said blanks being fed into the field of operation of rotary mandrels and pressing mechanisms to be formed into liquid-tight flat bottomed cups.

A further object of the invention is to provide a machine adapted to apply glue to a cup body blank, punch out and form a bottom blank and then form the body blank around the bottom blank, pressing a flange of the bottom blank between a glued bent over margin of the body blank to produce a completed flat bottomed cup adapted to be automatically discharged from the machine.

Another object of the invention is to provide a machine having means for transferring a cup body blank from a magazine to a glueing mechanism and then to a rotary former having grippers for clamping the blank to permit the same to be formed around a flanged bottom member to enclose the same to produce a completed flat bottomed cup which is pushed from the former and permitted to drop by gravity from the machine.

It is furthermore an object of this invention to provide a machine having a cam controlled pivoted mechanism for punching a cup bottom blank from a strip of paper and delivering the same into the end of a forming mandrel, while a body blank is supplied with glue and is then formed around the mandrel and crimped and glued to said bottom blank to form a completed cup which is automatically pushed from the mandrel.

It is a further object of the invention to provide a machine wherein a rotatable spider carries a plurality of rotatable mandrels and presser rolls, with each of said mandrels adapted when in an initial position to have a plurality of blanks fed thereto and then consecutively carried thereby through other positions whereby one of the blanks is formed around and pressed against another to produce a liquid-tight flat bottomed cup which in the final position of the former is automatically released and pushed off of the mandrel to be discharged from the machine.

It is also an object of this invention to provide a machien having means for applying adhesive to one blank carried on a rotatable transfer device, while another blank is first punched from a strip of material and delivered into a recess in the end of a forming mandrel, to be carried thereby as the adhesived blank is formed therearound and glued to itself after which another adhesived portion of the adhesived blank is crimped around and pressed against the flange of the punched blank to form a flat bottomed cup the upper margin of which is curled outwardly to form a drinking bead or rim, after which the completed cup is automatically released and pushed from the forming mandrel and discharged from the machine.

It is an important object of this invention to provide a paper cup making machine of the rotary type having a rotatable transfer mechanism for transferring cup body blanks from a magazine to a glueing device and then to a rotatable forming mechanism adapted to carry blanks through different stations to permit glued body blanks to be formed around flanged bottom blanks and pressed thereon as the upper margins of the cups are curled to complete the forming of the cups which are automatically discharged from the forming mechanism.

Other and further important objects of this invention will be apparent from the disclosures in the specification and the accompanying drawings.

The invention (in a preferred form) is illustrated in the drawings and hereinafter more fully described.

Figure 1, top plan view of machine unit.

Figure 2, enlarged fragmentary top plan view of the body blank feeding and glueing mechanisms.

Figure 3, vertical view of glueing mechanisms taken on line III—III of Figure 2.

Figure 4, vertical side view of blank feeding and glueing mechanisms, taken on line IV—IV of Figure 2.

Figure 5, vertical detail view of the cup forming mechanism, taken on line V—V of Figure 1, with parts omitted.

Figure 10 is an enlarged fragmentary detail section of the base cup flange ironing mechanism, together with sectional details of the mandrel rotating gears, with the section taken on line X—X of Figure 5, with parts omitted.

Figure 11 is a reduced fragmentary detail section taken on line XI—XI of Figure 10, illustrating the control trip mechanism governing the movement of the crimping and ironing mechanisms.

Figure 12 is a fragmentary detail sectional view taken on line XII—XII of Figure 5, illustrating one of the presser rolls.

Figure 13 is a sectional detail of the presser roll taken on line XIII—XIII of Figure 12.

Figure 14 is a schematic view of the cup forming mechanisms with parts omitted and illustrating the control cams governing the forming mandrel cup rim formers and the movement of the presser rollers.

Figure 15 is a fragmentary detail view taken on line XV—XV of Figure 14, illustrating the control cam for curling the cup rims.

Figure 16 is an enlarged detail section of one of the cup forming mandrels.

Figure 17 is an enlarged transverse section of a forming mandrel taken on line XVII—XVII of Figure 16.

Figure 18 is an enlarged transverse detail section of a forming mandrel taken on line XVIII—XVIII of Figure 16, showing the blank gripper in closed position.

Figure 19 is a similar section showing the blank gripper tripped into open position.

Figure 20 is a detail sectional view of the eccentric control taken on line XX—XX of Figure 8.

Figure 21 is a detail view of the cup bottom blank punch mechanism and the control cam governing the swing of the same taken on line XXI—XXI of Figure 9.

Figure 22 is an enlarged fragmentary detail section of the crimping mechanism for the lower ends of the cups with said section taken on line XXII—XXII of Figure 1.

Figure 23 is a similar section showing the crimper partially lowered to indicate the partially crimped position of the bottom margin of the cup over the cup bottom blank flange.

Figure 24 is a detail section similar to Figure 23, illustrating the completed crimping operation of the lower margin of the cup body blank over the flange of the cup bottom blank.

Figure 25 is an enlarged top plan view of the cup body blank glueing mechanism illustrating a body blank in dotted lines.

Figure 26 is a vertical detail section of the glueing mechanism taken on line XXVI—XXVI of Figure 25.

Figure 27 is an enlarged vertical detail section of the cup body blank feeding mechanisms taken on line XXVII—XXVII of Figure 2.

Figure 28 is a transverse detail view of the cup body blank feeding mechanisms taken on line XXVIII—XXVIII of Figure 27.

Figure 29 is a developed plan view of the cup body blank.

Figure 30 is a plan view of the cup bottom blank.

Figure 31 is a vertical central section of the completed cup.

As shown on the drawings:

The improved rotary flat bottomed cup making machine embodying the present invention embraces a plurality of mechanism adapted to feed a strip of material through an adjustable cup bottom blank punch device to punch out and force a bottom blank into the recessed end of a forming mandrel to cause the margin of the bottom blank to be bent into the form of a flange; to feed a sector-shaped cup body blank from a magazine onto a rotatable transfer wheel to be carried thereby through the field of operation of an adhesive applying device to have strips of adhesive applied to the body blank without removal thereof from the transfer wheel; said transfer wheel then adapted to deliver the adhesive cup body blank into engagement with a forming mandrel to permit a tab of the adhesived blank to be gripped by grippers carried by the mandrel to cause the body blank to be shaped around the mandrel and around the flanged bottom blank; to carry the partly formed cup blanks into another position wherein mechanisms act in timed relation to cause an adhesived margin of the body blank to be bent around the flange of the bottom blank and be pressed thereagainst to hold the bottom blank securely gripped by the body blank; to cause the upper margin of the partly formed cup to be curled downwardly and outwardly to form a rounded drinking rim on the cup; to effect a conveyance of the formed cup by the mandrel into a position wherein ironing devices act to iron the crimped-over lower margin of the cup body tightly against the flange of the cup bottom; and then to effect the further conveyance of the finished cup into a final position wherein cam controlled means are operated to automatically cause release of the grippers as a plunger device within the mandrel is operated to push the completed cup off of the mandrel permitting the cup to drop by gravity from the machine to be counted and stacked if desired.

Figure 4:
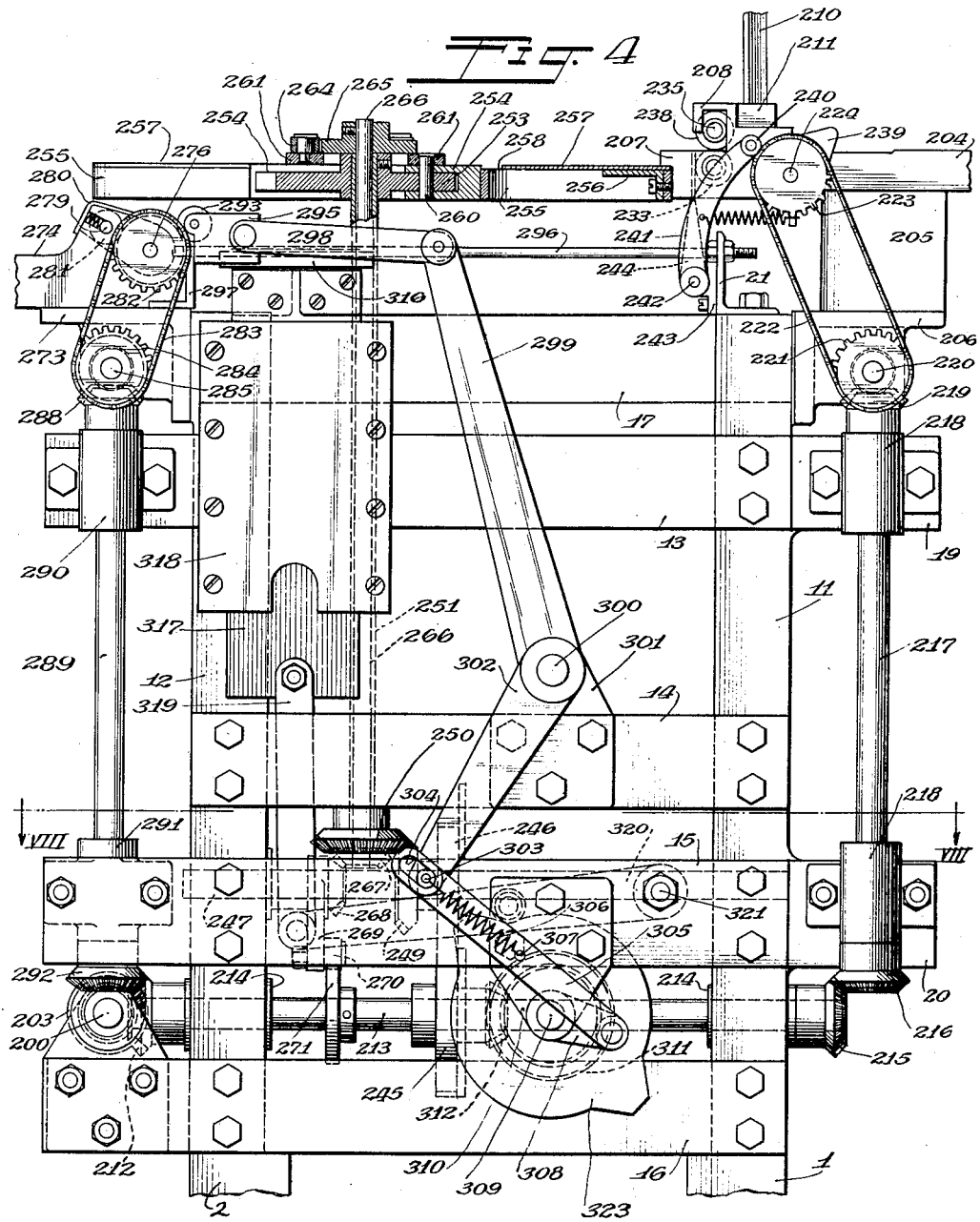
Figure 5:
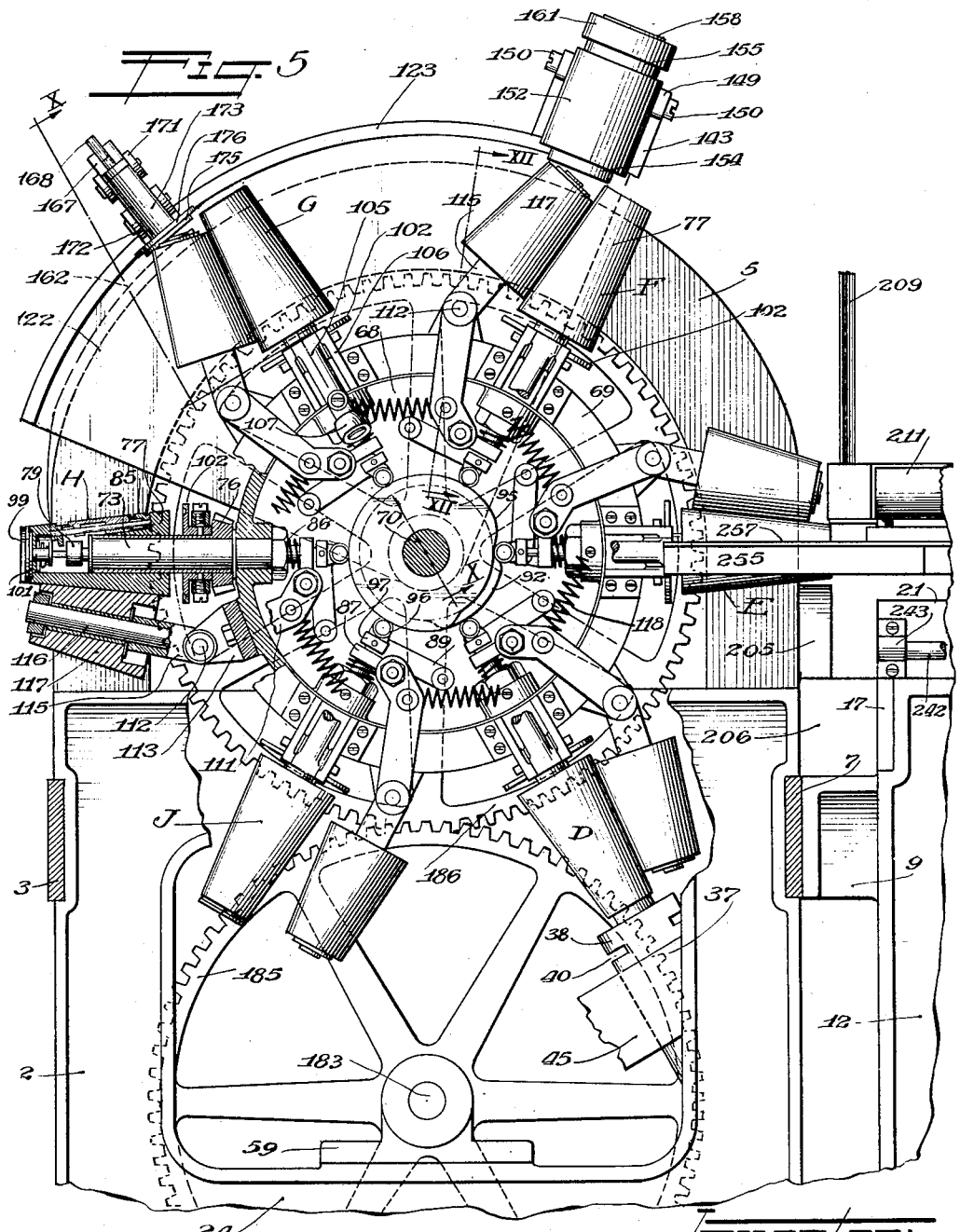

With the above briefly mentioned operations in mind, the improved machine consists generally of a plurality of associated devices which are supported upon a metal framework comprising a pair of spaced main metal frames 1 and 2, connected at their outer vertical edges by upper and lower cross beams or bars 3 and 4, respectively. Rigidly mounted upon the top of the main frame 1 is a hollow metal arch or yoke 5. The inner vertical edges of the main frames 1 and 2 are connected by upper and lower transverse beams 7 and 8, respectively. Rigidly secured to the beams 7 and 8 are the upper and lower bracket arms 9 and 10, respectively, which are integrally formed on the inner vertical edges of a pair of auxiliary metal frames 11 and 12 positioned in the planes of the main frames 1 and 2, respectively. Rigidly connecting the outer edges of two auxiliary frames 11 and 12, are a plurality of parallel cross beams or bars 13, 14, 15 and 16, (Figure 4). The inner edges of the two auxiliary frames 11 and 12 are connected by transverse beams or bars 17 and 18. Integrally formed or rigidly secured to the outer side of the auxiliary frame 11 are upper and lower brackets 19 and 20, respectively. Secured upon the top of the auxiliary frame 11, is an angle bar 21.

It will be conducive to a clear understanding of the operation of the machine to describe at this point the character and arrangement of the main driving mechanism. A horizontal main drive shaft 22 is journalled in suitable bearings 23 secured to the bottom of the middle cross bars 24 of the main frames 1 and 2. The main shaft 22 is adapted to be connected to receive a drive from any suitable source of power.

Figure 8:
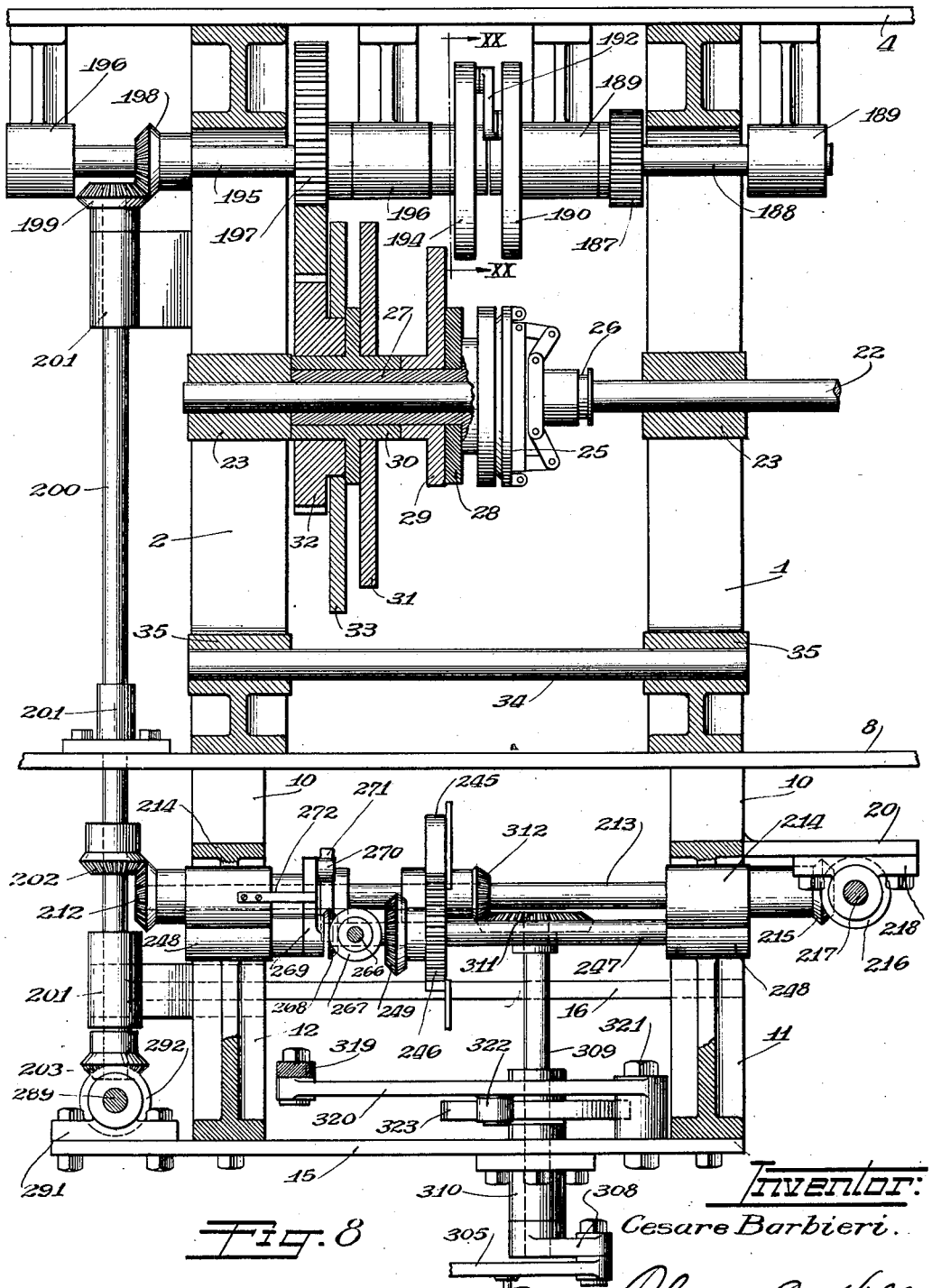
Figure 8 is a sectional plan view of the lower portion of the machine taken on line VIII—VIII of Figure 4.

Mounted on the shaft 22 is a control clutch 25, having a grooved collar 26 adapted to receive a shifting fork (not shown) to permit the clutch to be thrown into engagement with a bottom blank cam supporting sleeve 27, loosely engaged on the shaft 22, (Figure 8). Secured on the cam supporting sleeve 27 is a control cam 28 for governing the pivoted or swinging movement of the bottom blank punch mechanism. Also mounted upon the sleeve 27, adjacent the cam 28 is a feed strip control cam 29 for governing the feeding of the material from which the bottom blanks are punched. Fixed on the sleeve 27 adjacent the hub of the cam 29 is a flanged spacing collar 30. Secured on the collar 30 to the inside of the flange thereof is a bottom blank punch control cam 31. Fastened upon the collar 30 to the outside of the flange thereof is a gear 32 on the hub of which a bottom blank forming control cam 33 is secured.

Figure 6:
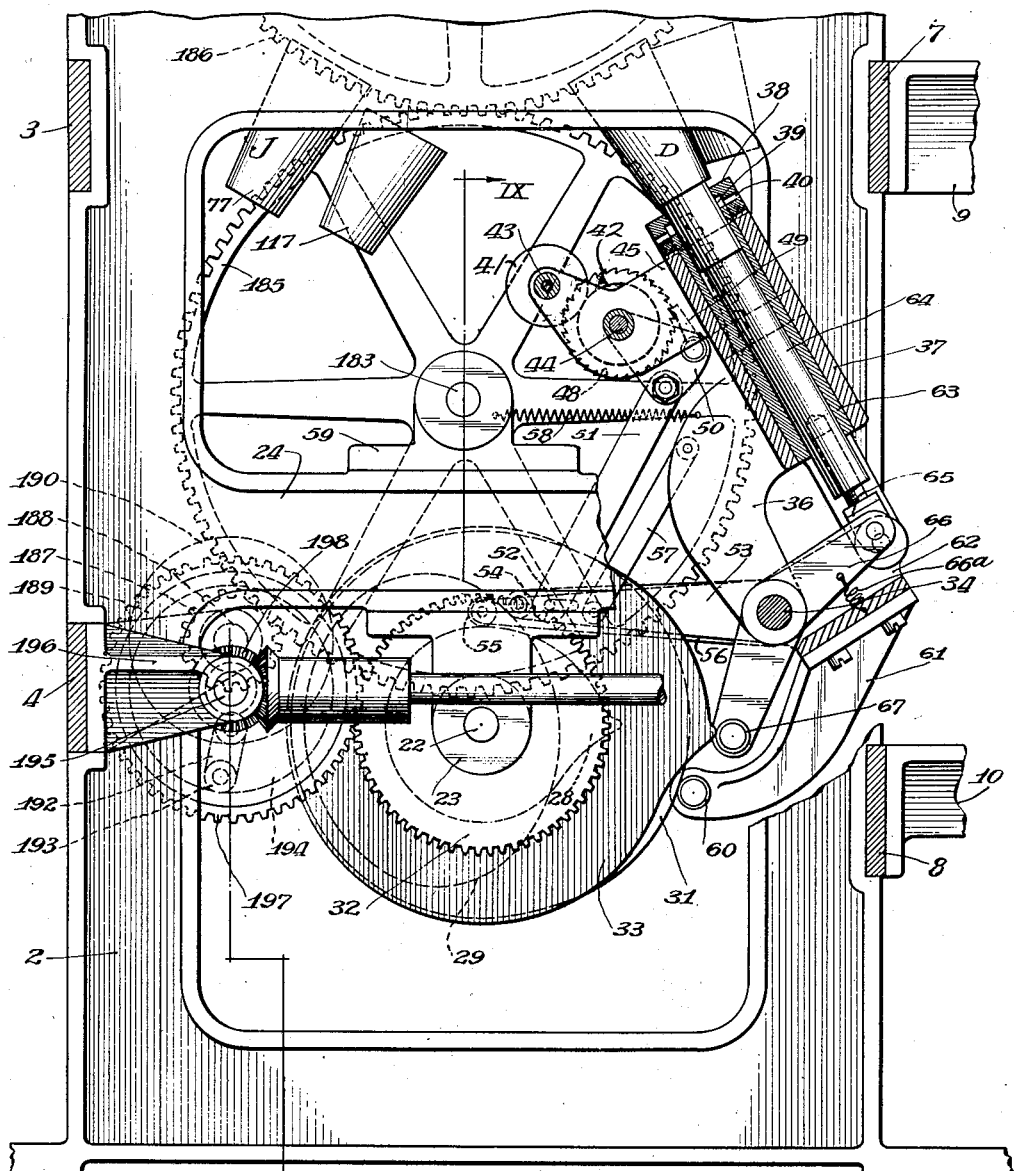
Figure 6 is a vertical detail view partly in section also taken on line V—V of Figure 1, illustrating a continuation of the lower portion of Figure 5, showing the cup bottom blank punching and forming mechanisms and the controls therefor.
Figure 7:
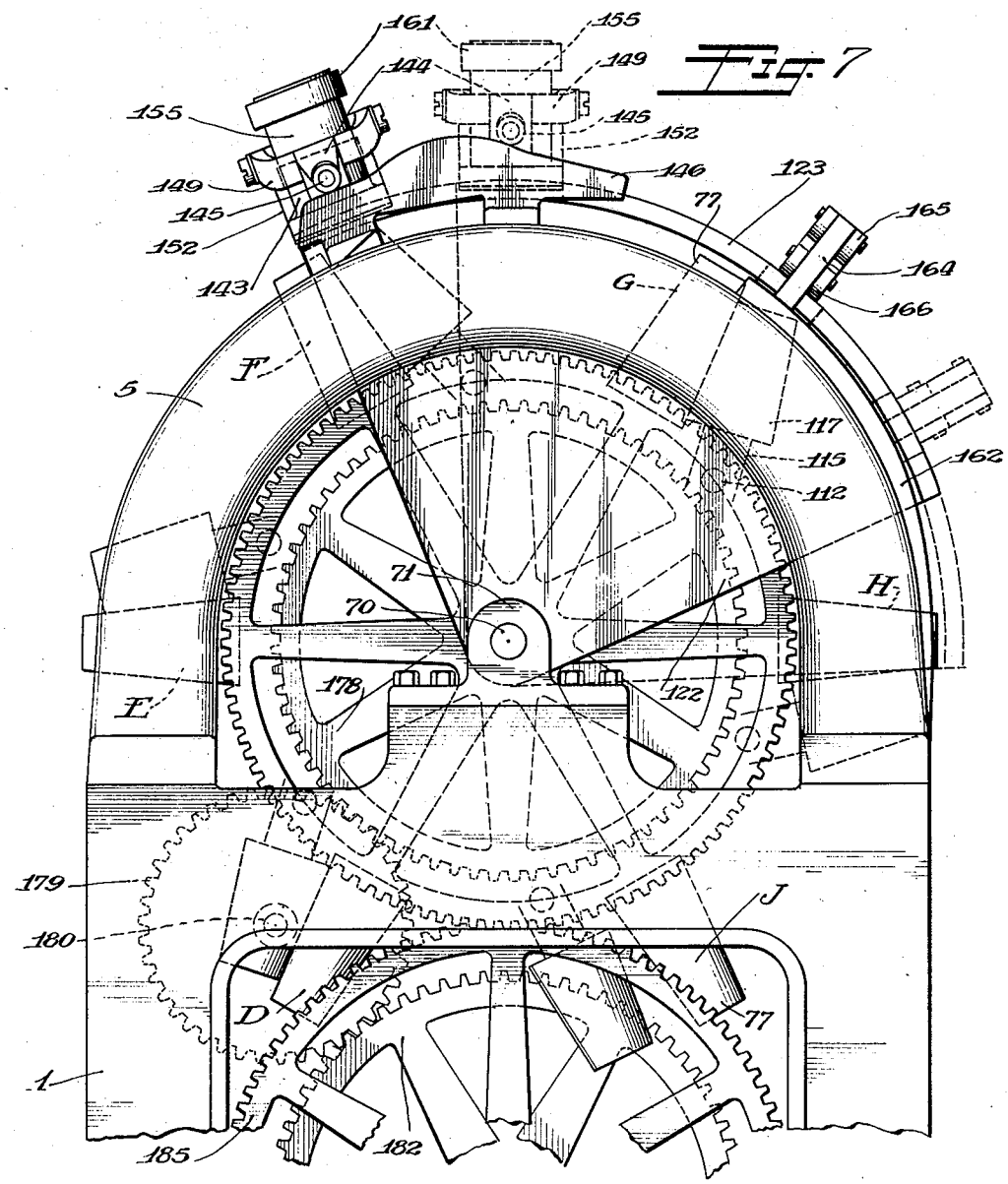
Figure 7 is a vertical detail view of the cup forming end of the machine, taken on line VII—VII of Figure 1, showing the cup crimping mechanism and the extreme position of movement thereof in dotted lines.

The bottom blank punching and forming mechanisms are associated with a transverse supporting shaft 34, the ends of which are engaged in sleeves 35 integrally formed on the main frames 1 and 2. Pivotally mounted on the shaft 34 are a pair of spaced bracket legs 36 which are integrally formed on a punch housing 37. Secured on the upper end of the punch housing 37 is a die head 38 having a punch recess 39 therein, and an outlet opening in the end thereof (Figure 6). Also provided through the die head 38 is a diametric slot 40 through which a strip of prepared paper is adapted to be fed to permit bottom blanks to be punched therefrom. The strip of paper is adapted to be unreeled from a roll of paper which may be mounted in any suitable place on the machine frames. The strip of paper is threaded through the slot 40 and passes between a pair of feed rolls 41 and 42 (Figure 9) supported on shafts 43 and 44, respectively. The roller shafts 43 and 44 are journalled in bracket arms 45 formed on the sides of the punch housing 37. Fixed on one end of the roller shaft 43 is a gear 46 which receives a drive from a meshing gear 47 fixed on one end of the roller shaft 44. Secured on the other end of the roller shaft 44 is a ratchet 48 operable by means of a spring controlled pawl 49. The pawl 49 is mounted on a plate 50 which is pivotally engaged on the roller shaft 44 between the roll 42 and the ratchet 48. Also pivoted on the plate 50 is one end of a connecting link 51 the lower end of which carries a pin 52 engaged in a slot provided in a lever arm 53 rotatably supported on the shaft 34 (Figure 6) and carrying a roller 54 on its outer end, said roller 54 tracking on the periphery of the control cam 29, which governs the feeding of the strip of paper at predetermined times.

Tracking on the periphery of the punch swing control cam 28 is a roller 55 which is carried on one end of a lever arm 56 the other end of which is pivotally supported on the shaft 34. Pivotally connecting the lever arm 56 with one of the leg brackets 36 is a connecting bar or link 57. A coiled spring 58 has one end thereof attached to one of the leg brackets 36 and the other end connected to a bearing member 59 mounted on the cross bar 24 of the main frame 2.

The punch operating control cam 31 coacts with a roller 60 carried on a lever arm 61 which is fastened to a bracket 62 pivoted on the shaft 34. The bracket 62 is pivotally connected with the outer lower projecting end of a bottom blank punch sleeve 63 which is slidably disposed within the punch housing 37 for co-action with the die head 38.

Slidably projecting through the punch sleeve 63 is a bottom blank forming plunger 64 the upper end of which is of enlarged diameter and is adapted to be projected through the die head 38 to form punched out bottom blanks with flanges and then deposit the flanged bottoms into the ends of mandrels as hereinafter more fully described. A connector 65 is adjustably secured in the lower end of the forming plunger 64, and pivotally connected with said connector 65 is the forked end of a bell-crank member 66 which is pivoted on the shaft 34. The lower arm of the bell-crank member 66 carries a roller 67 which coacts with the periphery of the bottom blank forming control cam 33.

The various operations of forming flat bottomed cups are focussed about a spider or turret wheel 68 provided with an apertured flange or rim 69. The turret wheel 68 is keyed on an upper shaft 70 journalled in bearings 71 and 72 secured upon the main frames 1 and 2 respectively. Supported radially upon the turret wheel flange 69 are six mandrel mechanisms of similar construction and each comprising a flanged spindle 73 projecting through an opening in the turret wheel flange 69 and rigidly clamped thereon by means of a retaining nut 74 threaded onto the inner projecting end of said spindle. Rotatably engaged on the spindle 73 is a mandrel supporting sleeve 75 having a bevel gear 76 secured on the inner end thereof and a chamfered frustum shaped mandrel 77 fixed on the outer end thereof, as illustrated in Figure 16. Slidably projecting through the spindle 73 is a gripper control sleeve 78 on the outer end of which a notch gripper control cam 79 is secured. The cam 79 is adapted to be shifted into the path of movement of a trip lug 80 (Figure 18) formed on one of a pair of blank grippers or clamping dogs 81 mounted in recesses 82. The two grippers 81 are secured on the ends of a shaft 83 journalled in a bearing block 84 in which the recesses 82 are provided. The bearing block 84 is fixed in a recess provided in the mandrel 77. Springs 85 are engaged around the shaft 83 and are connected with the grippers 81 to normally hold said grippers in closed or gripping position as illustrated in Figure 18.

Engaged around the inner projecting end of the sleeve 78 is a control spring 86 which seats between the end of the spindle 73 and a bracket arm 87 fixed on the inner end of the sleeve 78. The bracket arm 87 carries a pin 88 which projects into an opening in a lever arm 89 pivoted at one end on a stud 90 formed on the turret wheel 68 (Figure 16). A roller 91 is mounted on the lever arm 89 and tracks on the peripheral surface of a gripper control cam 92 secured on the hub 93 of a bearing sleeve or collar 94 positioned within the shaft bearing 72.

Also secured on the hub 93 of the bearing collar 94, adjacent the cam 92 is a cup loosening control cam 95 having a roller 96 tracking on the periphery thereof. The roller 96 is mounted on a bracket 97 fixed on the inner projecting end of a cup ejector rod 98. The rod 98 is axially passaged and slidably projects through the sleeve 78 and through the mandrel 77. Fixed on the outer end of the rod 98 is a cup ejector head or plunger 99 which is normally held seated by means of a spring 100 in a seat 101 provided in the recessed outer end of the mandrel 77.

Slidably mounted on each mandrel spindle 75, adjacent the inner enlarged end of the mandrel 77 is a cup rim forming or curling plate or disk 102 provided with an annular rounded groove 103. Pivoted on the hub of the rim shaping disk 102 is the forked spring controlled arm 104 of a bell crank member also having a single arm 105. The bell crank member 104—105 is pivotally supported on a two arm bracket 106 fixed on the rim 69 of the turret wheel. A roller 107 is rotatably mounted on the end of the bell crank arm 105 and is adapted to ride over a cup edge forming control cam 108 fixed on the bearing member 72 (Figure 14).

Secured on one side of the main frame 2 below the bearing member 72 is a pressing roll control cam 109 over which a roller 110 is adapted to ride. The roller 110 is mounted on one end of a crank arm 111 secured on one end of a pin shaft 112 journalled in a bracket 113 fixed on the turret wheel rim 69. One end of the pin shaft 112 is squared to form a tip 114. Keyed on the pin shaft 112 is the shank 115 of a spindle 116 having a cup presser frustum roll 117 rotatably mounted thereon for pressing co-action with its respective mandrel 77. A coiled spring 118 connects the crank arm 111 with turret wheel rim 69 to resiliently hold the presser roll 117 in pressing contact with the cup forming mandrel 77.

The forming mandrels 77 are adapted to be rotated by means of the bevel gears 76 which are in meshing relation with a large bevel gear wheel 119. The gear wheel 119 is secured to the flange 120 of a sleeve 121 rotatably engaged on the shaft 70 (Figure 10) adjacent to turret wheel 68. Pivotally engaged on the sleeve 121 is a segment shaped bracket 122 having a peripheral flange 123. Projecting through a bearing sleeve 124 formed on the segment bracket 122 is a rocker shaft 125 on one end of which a crank arm 126 is fixed and projects into the path of movement of the squared ends 114 of the pins 112 carried by the turret wheel brackets 113. Fixed on the other end of the rocker shaft 125 is a crank arm 127 adapted to be moved into engagement with a trip pin 128 fixed on the frame yoke 5 (Figure 10), to permit the segment bracket 122 to be moved from the dotted line position of Figure 11, back into its full line position by the action of a control spring 129 one end of which is attached to the bracket 122. The other end of the spring 129 is connected to a stop pin 130 fixed on the frame yoke 5. The pin 130 limits the return movement of said segment bracket 122. Engaged around the hub of the crank arm 126 is a heavy control spring 131 one end of which engages a pin 132 on the segment bracket 122 while the other end of the spring 131 contacts one edge of the crank arm 126. A stop pin 133 on the segment bracket 122 limits the movement of the crank arm 126 by the spring 131.

After a cup body blank has been fed to a mandrel 77 and gripped by the grippers 81, it is rolled around the mandrel and is carried around by the turret wheel 68 into the position illustrated in Figure 22 to permit a crimping mechanism to coact with the outer end of the mandrel 77 to bend over and crimp the bottom edge 134 of the cup body blank 135 over the flange 136 of a cup bottom 137, Figure 30. The cup body blank 135 is of segment shape having two straight inclined edges 138 and 139 joined by two arc shaped edges 134 and 140. A tab or tongue 141 is integrally formed on the edge 138 of the cup body blank as illustrated in Figure 29.

The cup body blank crimping mechanism will now be described. Rigidly secured upon the advance end of the segment bracket flange 123 is a bracket plate 142 having bearing arms or lugs 143 integrally formed thereon between which a lever or beam 144 is fulcrumed. Mounted on one end of the lever 144 is a roller 145 which is resiliently held in tracking contact with a crimper control cam 146 having lugs which are screwed onto the top of the frame arch 5. Attached to the lever 144 is the upper end of a coiled spring 147 (Figure 22), the lower end of which is connected to a pin 148 projecting from the outer face of the segment bracket 122. Integrally formed on the inner end of the lever 144 is a fork or yoke 149 which carried a pair of pins 150 which project through longitudinal slots 151 provided in opposite sides of a cylindrical casing 152 integrally formed on the bracket plate 142. The lower end of the casing 152 is provided with a ring flange 153, through which the reduced lower end 154 of a deflecting sleeve 155 projects. The lower end of the reduced end portion 154 of the sleeve 155 is formed with a bevel seat or surface 156 adapted to engage the cup blank margin 134 and partially bend the same inwardly into the position illustrated in Figure 23. The deflecting sleeve is provided with a pair of shorter slots 157 through which the pins 150 also project to permit the same to engage in the sides of the head 158 of a crimping plunger 159 which is slidably engaged in the deflecting sleeve 155. A spring 160 is coiled around the plunger 159 beneath the plunger head 158 and seats upon a flange ring 154 integrally formed in the lower end of the deflecting sleeve. The downward movement of the deflecting sleeve 155 is limited by a stop collar or ring 161 fixed on the upper end of said sleeve and adapted to contact against the upper end of the casing 152 (Figure 23). When the deflecting sleeve 155 reaches its lowest position the continued downward movement of the forked end 149 of the lever 144 causes the pins 150 to push the plunger 159 downwardly in the sleeve 155 from the position shown in Figure 23 to that shown in Figure 24 thereby causing the projecting end of said plunger to crimp the edge 134 of the cup blank downwardly over the flange 136 of the cup bottom 137.

From the crimping position of the cup, said partly formed cup is carried by its mandrel and the turret wheel into an advanced position to be acted upon by the cup ironing mechanisms. These mechanisms are clearly illustrated in detail in Figure 10 and are actuated by means of a control cam 162 secured upon the frame arch 5 to permit a control roller 163 to track over the edge thereof. The roller 163 is mounted on one end of a bell-crank arm 164 having a forked or double bell-crank arm 165 formed at an angle on the other end thereof. The short bell-crank arm 164 is pivoted upon one end of a double bracket arm 166 fixed transversely upon the segment bracket flange 123. Integrally formed on the opposite end of the double bracket arm 166 is a sleeve 167. Slidably projecting through the sleeve 167 is a stem 168 on the lower end of which a frustum shaped ironing or pressing roller 169 is secured. Fixed on the stem 168 to the inside of the ironing roller 169 and spaced therefrom is a disk 170. Pivoted on the sleeve 167 is a double bell-crank 171 to the short arms of which the double bell-crank arm 165 is pivotally connected. Also pivoted on the sleeve 167 are a pair of arms 172. The bell-cranks 171 and the arms 172 are pivoted to a sleeve 173 having a stub shaft 174 journalled therein. Fixed on the lower end of the stub shaft 174 is a rotatable inner ironing or pressing disk 175 provided with an enlarged flat flange 176. The inner ironing disk 175 is adapted to be projected against the cup bottom 137 in contact with the glued crimped cup base, while the outer ironing roller 169 is positioned adjacent the outer periphery of the base of the partly formed cup to iron or press the base of the cup. The flange 176 projects into the space between the outer ironing roller 169 and the disk 170 to cause the roller 169 to be moved into operating position with the inner ironing disk 175. A control spring 177 connects the double bell-crank arm 165 with the double bracket arm 166, and acts to resiliently hold the roller 163 in engagement with the control cam 162.

Figure 9:
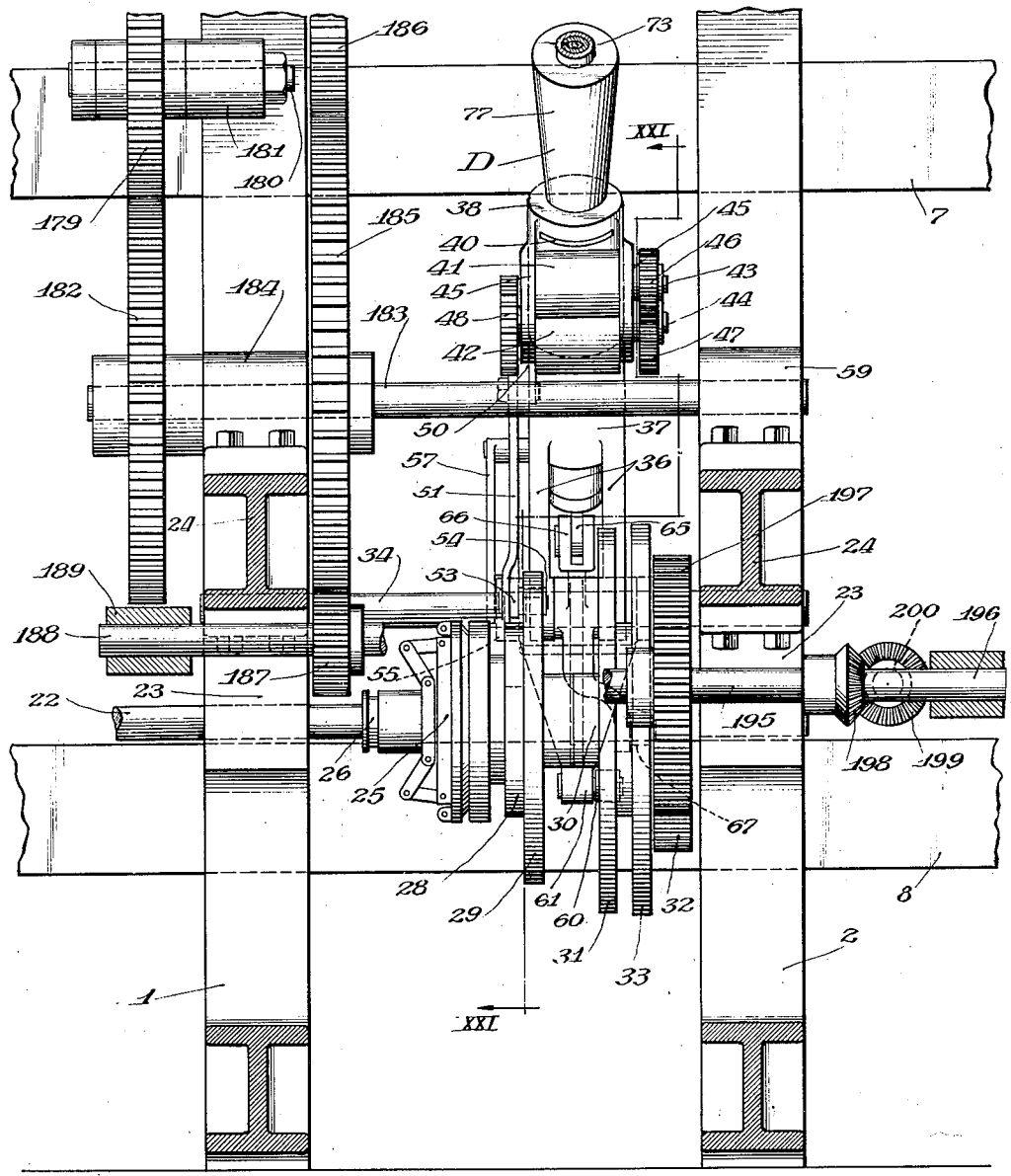
Figure 9 is a fragmentary vertical detail section, with parts omitted, taken on line IX—IX of Figure 6.

The turret wheel 68 is rotated by the shaft 70 on the outer end of which a gear 178 is fixed and receives a drive from a meshing intermediate gear 179 mounted on a stub shaft 180. The stub shaft 180 is journalled in a bearing bracket 181 fixed on the main frame 1 (Figure 9). Meshing with the intermediate gear 179 is a gear 182 fixed on the outer end of an auxiliary shaft 183 journalled in a bearing 184 on the main frame 1 and in the bearing 59 on the main frame 2. Also fixed on the shaft 183 to the inside of the main frame 1 is a large gear 185 which meshes with an upper large gear 186 keyed on the sleeve 121 to rotate the same and the large bevel gear 119 in a direction opposite to the direction of rotation of the turret wheel 68. The large lower gear 185 is in mesh with a driving pinion 187 fixed on a stub shaft 188 journalled in a pair of bearing brackets 189 secured to the inner face of the lower cross bar 4 (Figure 8). Mounted on one end of the stub shaft 188 is an eccentric disk 190 which carries an eccentric pin 191 (Figure 20) on which a connecting rod or link 192 is pivotally engaged. The other end of the link 192 is pivotally connected on an eccentric pin 193 fixed on a second eccentric disk 194 mounted on a shaft 195. The shaft 195 is journalled in bearing brackets 196, also mounted on the inner face of the cross bar 4. Fixed on the stub shaft 195 is a gear 197 which receives a drive from the gear 32 (Figure 8).

A small bevel gear 198 is mounted on the stub shaft 195 and meshes with a bevel gear 199 fixed on one end of a long power transfer shaft 200 journalled in bearing brackets 201 secured to parts of the machine framework. Also fixed on the shaft 200 is an intermediate bevel gear 202 and an end bevel gear 203.

The cup body blank feed mechanisms will now be described. A stack of paper cup body blanks 135, shaped as illustrated in Figure 29, are adapted to be supported upon a magazine base plate 204 provided with integral supporting legs 205 formed on the top of a shelf bracket 206 secured to the outer side of the upper portion of the auxiliary frame 11 (Figures 4 and 27). The magazine plate 204 is provided with a pair of inwardly projecting arms 207. Secured upon the top edge of each magazine arm 207 is a bearing bracket 208. Secured upon the top of the magazine base plate 204 are a pair of cup body blank guide posts 209 against which the arcuate edges 140 of the cup body blanks are adapted to engage. The arcuate edges 134 of the cup body blanks 135 are adapted to be positioned adjacent a pair of guide ports 210 supported vertically upon a cross bar 211 the ends of which are secured upon the supporting flanges of the bearing brackets 208.

Meshing with the bevel gear 202 (Figure 8) is a bevel gear 212 which is fixed on one end of a shaft 213 journalled in bearings 214 supported on the machine frames 11 and 12. A bevel gear 215 is fixed on the opposite end of the shaft 213 and is in mesh with a bevel gear 216 which is mounted on the lower end of a vertical shaft 217.

The shaft 217 is journalled in bearings 218 fastened on the brackets 19 and 20 which are rigidly secured or formed on the outer side of the auxiliary frame 11 (Figure 4). Mounted on the upper end of the shaft 217 is a bevel gear 219 which meshes with a bevel gear fixed on a shaft 220 journalled in the shelf bracket 206. Also engaged on the shaft 220 is a sprocket 221 around which an endless chain 222 is trained. The chain 222 is also trained over a sprocket 223 fixed on one projecting end of a cup body blank feed shaft 224. The blank feed shaft 224 is journalled in bearings formed on the magazine arms 207 and has mounted thereon a cup body blank feed roller 225 having a plurality of spaced disks 226 formed thereon. Each disk 226 is provided with a pair of diametrically opposite notches in which friction blocks or pads 227 are secured (Figure 27) to project beyond the periphery of said disks. The friction pads are adapted to engage the lowermost cup body blank in the magazine at each half revolution of the shaft 224.

Fixed on one projecting end of the blank feed shaft 224 is a gear 228 which meshes with an intermediate gear 229 fixed or a stub shaft 230 journalled in one of the magazine arms 207 (Figure 27). The intermediate gear 229 drives a lower gear 231 keyed on one end of a lower roller shaft 232 which is supported by the magazine arms 207. A lower blank feed roller 233 is mounted on the lower shaft 232. Meshing with the lower feed roller gear 231 is an upper feed roller gear 234 which is fixed on one end of an upper roller shaft 235 journalled in bearing blocks 236 slidably mounted in the brackets 208 beneath control springs 237. An upper feed roller 238 is mounted on the upper shaft 235 in co-acting relation with the lower feed roller 233.

Mounted on the blank feed shaft 224 to the inside of the sprocket 223 is a cam 239 with which a roller 240 coacts. The roller 240 is carried by a curved spring controlled lever or crank arm 241 (Figure 4) which is engaged on one end of a rocker shaft 242 supported in bearing brackets 243 fastened to the angle iron 21. Fixed at spaced intervals on the rocker shaft 242 are a pair of blank pusher arms 244 adapted at predetermined times to push cup body blanks discharged from the magazine onto a rotatable blank transfer device.

Figure 3:
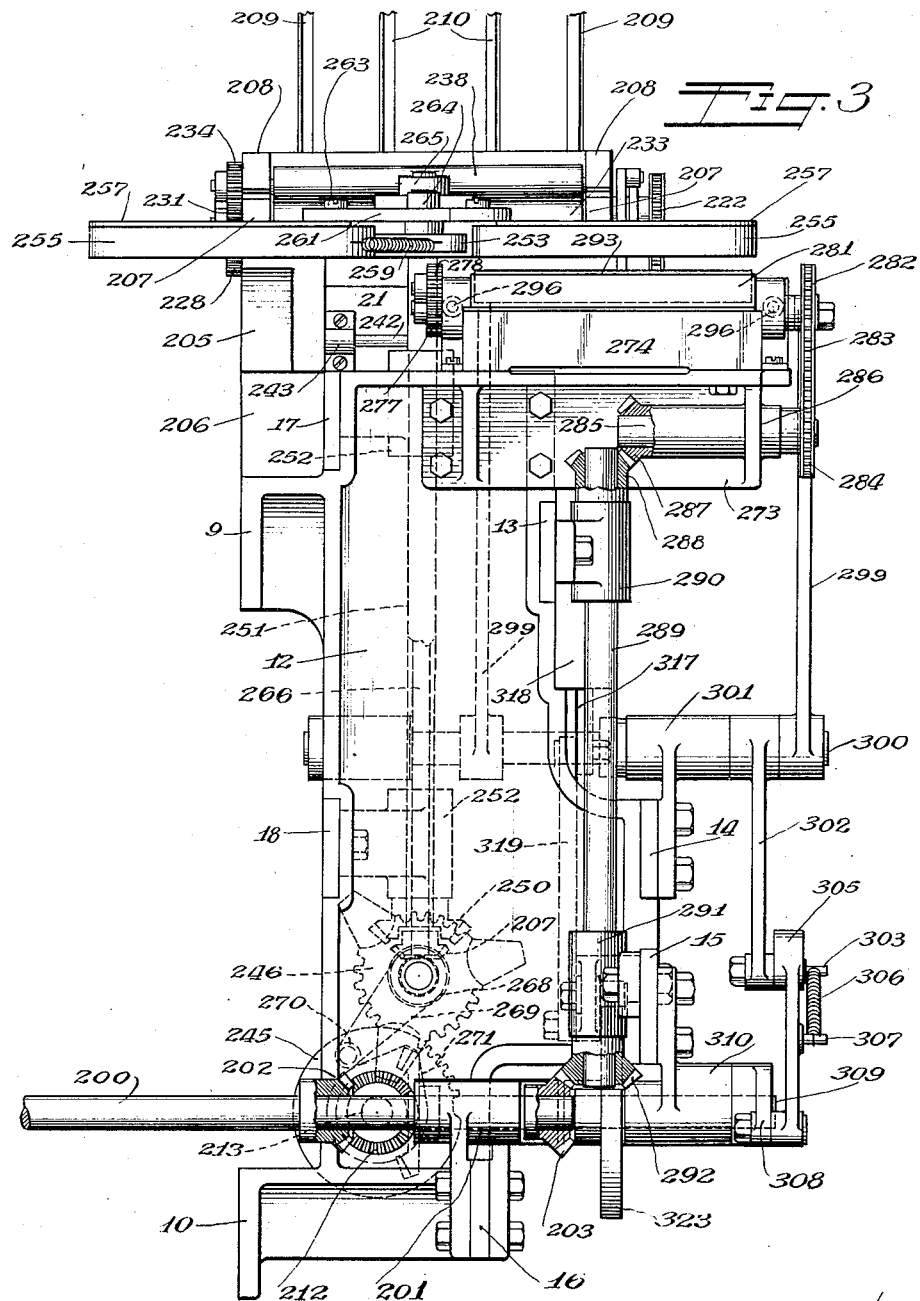

The cup body blank transfer mechanisms are provided for receiving blanks 135 from between the magazine feed rollers 233 and 238, and transferring said blanks by an intermittent motion first to a glue applying mechanism and then to the cup forming mandrels 77. A mutilated Geneva gear 245 is mounted on the shaft 213 and intermittently drives a Geneva gear 246 (Figures 4 and 8) which is fixed on a shaft 247 journalled in bearings 248 formed on the auxiliary frames 11 and 12. Secured on the shaft 247 is a bevel gear 249 which is in mesh with a bevel gear 250 fixed on the lower end of a hollow vertical shaft 251. The shaft 251 is journalled in bearings 252 secured to the cross bars 17 and 18 (Figure 3). Mounted upon the upper end of the shaft 251 is a hub or spider 253 on which three equidistantly spaced spoke brackets 254 are pivotally mounted. Rigidly secured to each spoke bracket 254 is a U-shaped or three sided frame 255 to the outer arc-shaped arm of which an angle bracket 256 is rigidly secured. Fastened to the top of each angle bracket 256 and projecting over the outer arm of the frame 255 is a blank supporting plate or table 257 having two edges thereof spaced from two of the arms of the frame 255 to afford a glue applying space 258 over which two margins of a cup body blank project when a blank 135 is fed outwardly by the feed rollers 233 and 238 and is pushed into a centered position upon one of the table plates 257 by the pusher arms 244. Attached to each spoke frame 255 is one end of a coiled spring 259 the other end of which is connected to the wheel hub 253. Pivoted on each pivot pin 260 of each spoke bracket 254 is a roller arm 261 having an arcuate slot 262 in one end thereof through which a set screw 263 projects to hold the roller arm 261 in a set position of adjustment on the spoke bracket 254. A roller 264 is rotatably mounted on each roller arm 261 and has resilient rolling contact with a control cam 265. The cam 265 is fixed on the upper end of a vertical shaft 266 which projects through the hollow shaft 251 and has a small bevel gear 267 secured on the lower end thereof.

The bevel gear 267 is in mesh with a bevel gear 268 secured to one side of a crank arm 269 pivoted on the shaft 247. A roller 270 is carried on the crank arm 269 and coacts with a control cam 271 fixed on the shaft 213 and rotatable therewith. The cams 271 and 265 control the delivery of the tab end of a cup body blank 135 to the gripper 81 of a forming mandrel 77. A spring 272 (Fig. 8) engages the crank arm 269 to return the same and the cam 265 to normal position after a tripping operation of one of the blank carrying spoke arms or tables of the rotatable blank feed wheel.

Figure 1:
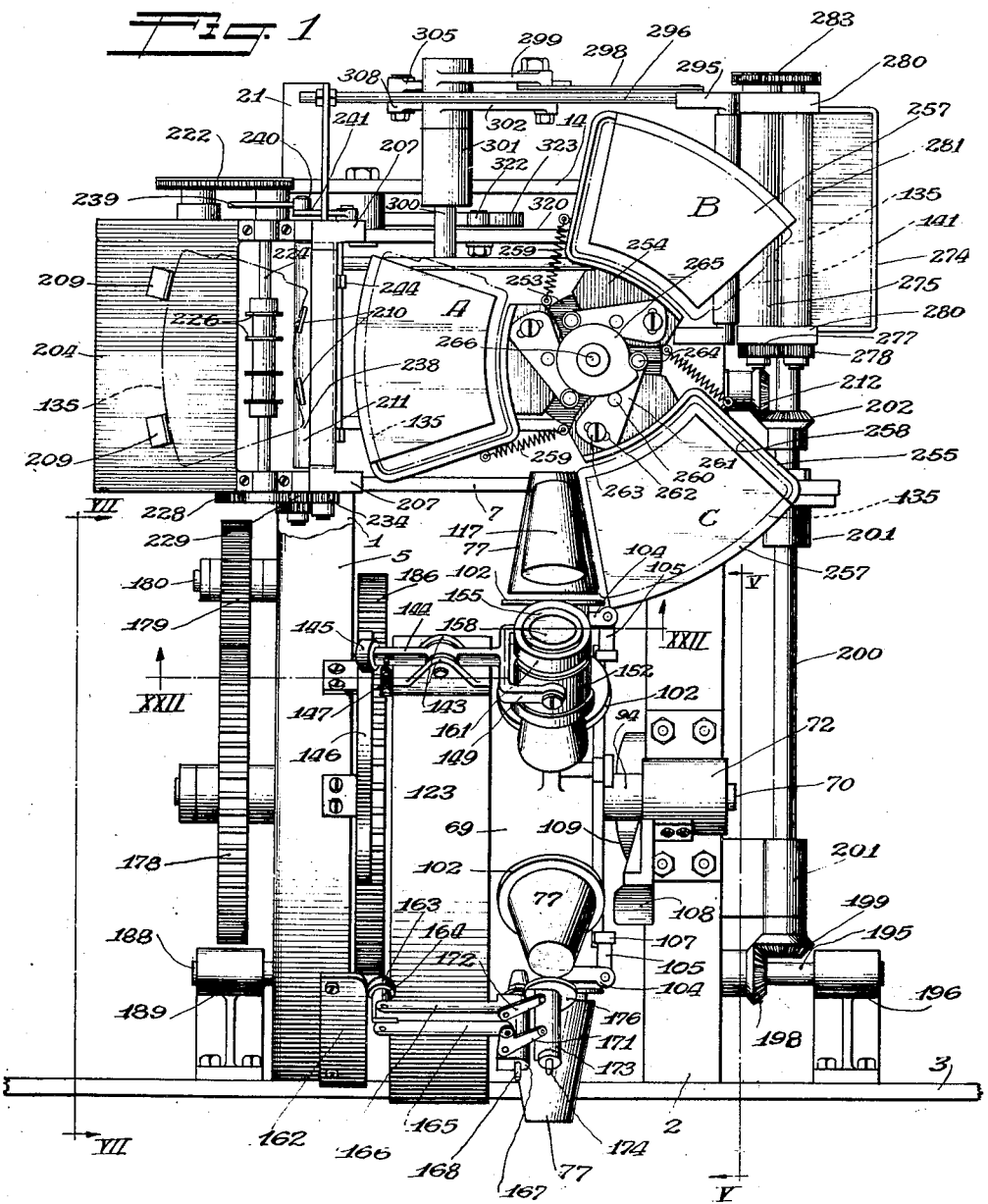

The blank transfer wheel comprises three sets of blank carrying tables (Figures 1 and 2), which are each adapted to be intermittently moved from a blank receiving position A, into a glue applying position B, and then into a delivery position C. After a cup body blank 135 has been fed onto a table 257 in position A, and properly centered by the push arms 244, the Geneva gears 245 and 246 cause the blank transfer wheel to be rotated one-third of a revolution thereby advancing the centered blank into position B, over the glue applying mechanisms which will now be described.

Referring to the detail Figures 25 and 26, a shelf 273 is rigidly secured to the upper end of the outer face of the auxiliary frame 12, and has supported thereon a glue tank or trough 274. Rotatably mounted within the tank 274 is an adhesive supply roller 275 which rotates in the glue within the tank. The roller 275 is supported on a shaft 276 one end of which projects from the tank 274 and has a gear 277 mounted thereon. The gear 277 meshes with a gear 278 mounted on one projecting end of a shaft 279 journalled in bearings 280 on the sides of the tank 274. An adhesive wiping roller 281 is mounted on the shaft 279 and coacts with the feed roller 275 to wipe the excessive glue therefrom. Secured on the second projecting end of the feed roller shaft 276 is a sprocket 282 around which an endless chain 283 is trained. The chain 283 is also trained around a driving sprocket 284 fixed on the outer end of a stub shaft 285 journalled in a bearing 286 forming part of the shelf bracket 273 (Figure 3). A bevel gear 287 is fixed on the inner end of the stub shaft 285 and meshes with a bevel gear 288 mounted upon the upper end of a vertical shaft 289. The shaft 289 is journalled in an upper bearing 290 secured to the cross bar 13 and in a lower bearing 291 mounted on the cross bar 15. A bevel gear 292 is fixed on the lower end of the shaft 289 and is in mesh with the bevel gear 203 to receive a drive therefrom.

An adhesive transfer or applying roller 293 is normally positioned to have rolling contact with the adhesive feed roller 275 to be supplied with a coating of adhesive. The roller 293 is supported on a shaft 294 the ends of which are journalled in a pair of blocks 295 slidably mounted on a pair of guide rods 296 supported by the angle bar 21 and by a plate 297 secured to the back of the glue tank 274 (Figure 26). Pivoted on each slide block 295 is a crank or link 298 the end of which is pivoted to the upper end of a long bell-crank arm 299. There are two arms 299 fixed on a rocker shaft 300 journalled in a bearing 301 secured to the cross-bar 14 (Figure 3). Also fixed on the rocker shaft 300 is a short bell-crank arm 302 carrying a pin 303 which projects through a slot 304 provided in one end of a connecting rod or bar 305 (Figure 4). Connected to the pin 303 is one end of a coiled control spring 306 the other end of which is connected to a pin 307 secured in the side of the connecting bar 305. The lower end of the bar 305 is pivoted to a crank arm 308 fixed on the outer end of a stub shaft 309 journalled in a bearing 310 fastened to the cross bar 15. Secured on the inner end of the shaft 309 is a bevel gear 311 (Figure 8), which receives a drive from a smaller bevel gear 312 on the shaft 213.

The above described mechanisms act to reciprocate the adhesive applying roller 293 over a straight adhesive applying flange or pad 314 and over a curved flange or pad 315 (Figure 25). The glue pads 314 and 315 are both formed upon the top of an adhesive stamping plate 316 which is mounted upon the upper end of a vertically slidable plate 317. The plate 317 is slidably mounted behind spaced guide rails or bars secured upon one face of an upright guide plate 318 supported on the cross bar 13. Pivoted to the lower end of the slide plate 317 is the upper end of a toggle bar 319 (Figure 4), the lower end of which is pivoted to one end of a lever 320 to be operated thereby. The lever 320 is pivoted to one end on a stud 321 projecting from the cross bar 15. Mounted on one side of the lever 320 is a roller 322 which tracks on the periphery of a glue stamping control cam 323 fixed on the shaft 309.

After a cup body blank has been stamped to apply a straight and a curved strip of glue to the under surface thereof, said adhesived body blank is advanced by the transfer wheel from position B, into position C, ready to be delivered to the grippers of a forming mandrel 77.

After a flat bottomed cup has been formed on a mandrel the turret wheel is rotated a predetermined distance, the roller 96 co-acting with the cup loosening control cam 95 (Figures 10 and 16) causes the cup ejector head or plunger 99 to be projected outwardly to loosen the formed cup on the mandrel just as an air blow-off mechanism for the cup is reached. The blow-off mechanism comprises a valve bracket 324 which is secured to the bearing collar 94 and is provided with an air passage 325 to which an air pressure supply pipe 326 is connected. An air control valve 327 is mounted in the valve bracket 324 and is diametrically passaged to afford a communication between the air supply pipe 326 and the air discharge passage in the cup ejector rod 98. The air valve 327 is spring controlled and is adapted to be opened by a cam 328 carried on the bracket 97 for co-action with a roller 329 engaged on an arm 330 connected to the air control valve 327. When the air valve 327 is opened air under pressure passes through the ejector rod 98 and blows the loosened cup off of the mandrel 77.

The operation is as follows:—

A somewhat detailed description of the operation of the respective mechanisms comprising the rotary type flat bottom cup machine, has already been given in connection with the detailed description of the various auxiliary mechanisms, so that it will only be necessary to give a brief résumé of the operation of the machine embracing the embodiment illustrated and described.

The machine is started by shifting the starting clutch 25 so that a drive from the main driving shaft 22 is transmitted to the cam sleeve 27 (Figure 8), to cause rotation of the feed strip control cam 29. The strip of prepared material is adapted to be removed from a reel which is rotatably supported in a convenient position on the machine frame. The strip of paper is threaded through the slot 40 in the die head 38 and passes between the feed rollers 41 and 42 which act to advance the strip a predetermined distance each time the lever arm 53 is operated to actuate the connecting link 51 which in turn operates the pawl 49. The pawl 49 acts on the ratchet 48 (Figure 6) to rotate the same and the feed rollers 41 and 42 thereby advancing the strip of material through the die head 38.

The cam 28 now acts to operate the lever arm 56 causing the link 57 to gradually swing the bottom blank punch mechanism housing 37 from the full line position of Figure 21 toward the dotted line position. It will be noted that this operation causes the bottom blank punch mechanisms to be gradually advanced for a short distance with the rotation of the turret wheel so that the punch mechanisms will be aligned with a forming mandrel during the time that a cup bottom blank is being ejected from the punch mechanism into one end of a mandrel.

At this point in the operation the punch control cam 31 actuates the lever arm 61 to cause the punch sleeve 63 to coact with the die head 38 to punch a circular cup bottom blank out of the strip of paper. Immediately following the punching operation the control cam 33 operates the bell-crank 66 thereby causing the bottom blank forming plunger 64 to engage the punched out bottom blank 137 and force the same out of the end of the die head 38 causing the margin of the bottom blank to be shaped into a flange 136. The flanged cup bottom blank thus formed is pushed into the seat 101 provided in the outer end of the forming mandrel 77, and seats against the ejector head 99. The plunger 64 is returned to normal position by a coiled spring 66a connected to the bell-crank member 66 and to the bracket 62 (Figure 6). With the retraction of the forming plunger 64 the spring 58 acts to return the punch mechanisms to the normal full line position of Figure 21, while the formed cup bottom 137 is carried from the cup bottom receiving station D, to the cup body blank receiving station E.

The cup body blanks 135 are supported on the magazine base plate 204 between the guide posts 209 and 210 with the lowermost body blank positioned over the discharge roller 225 which is rotated by the chain 222 (Figure 4). With the rotation of the roller 225 the pads 227 thereon are brought into frictional contact with the lowermost body blank causing said blank to be discharged from the magazine and advanced between the feed rollers 233 and 238 operated by the gears 228, 229, 231 and 234 (Figures 27 and 28). The rollers 233 and 238 advance the body blank 135 over the pusher arms 244 and onto one of the table plates 257 of the body blank transfer wheel.

Figure 2:
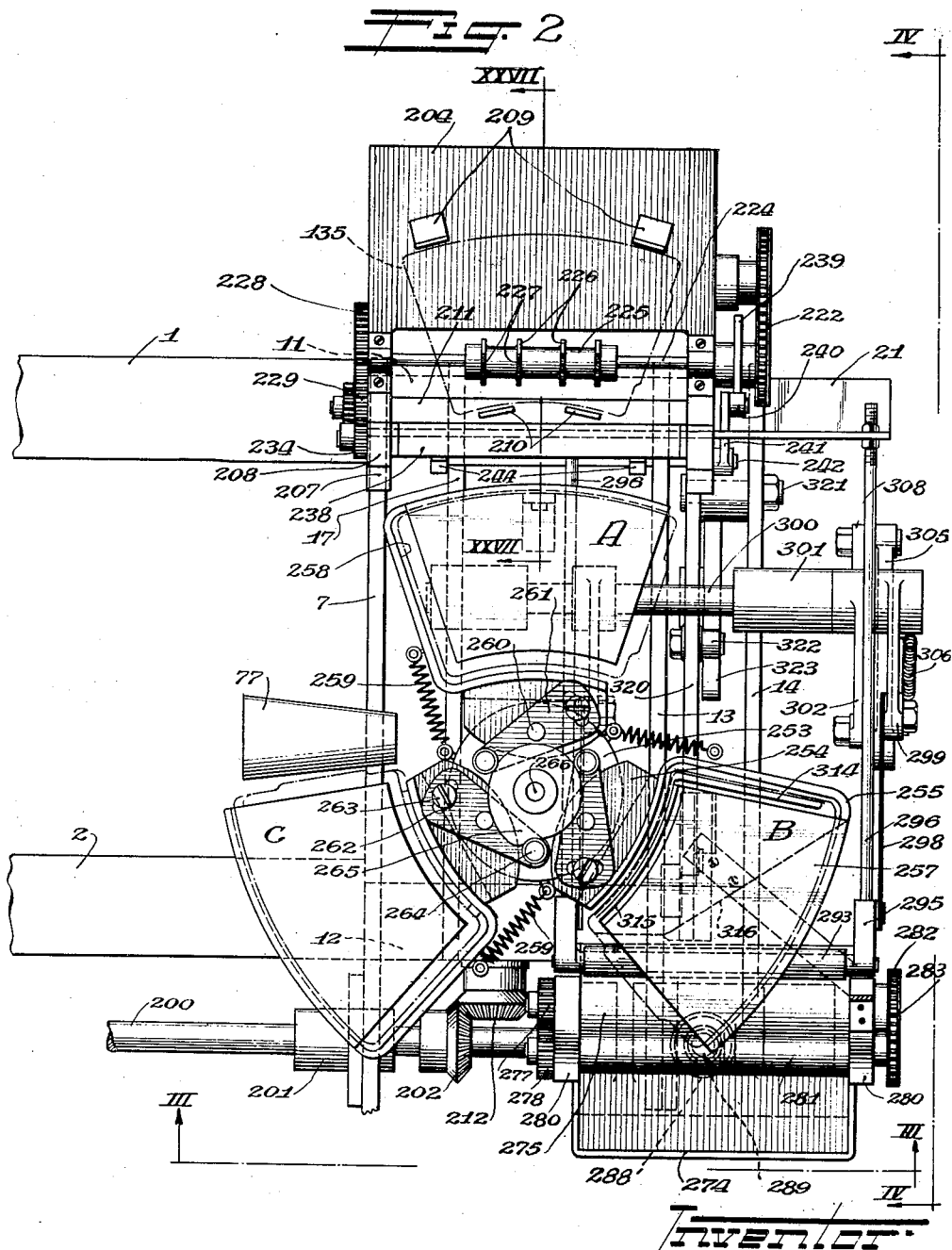

At this stage of the operation the cam 239 (Figure 4) co-acting with the roller 240 rocks the crank arm 241 and the shaft 242 thereby causing the two pusher arms 244 to engage against the arcuate edge 140 of the body blank and push said blank into a centered position upon the table plate 257 when the same is in station A (Figure 2). In the advanced centered position of a body blank upon one of the table plates of the transfer wheel, the margins 134 and 139 of the blank project beyond the edges of the table plate into the glue applying space 258 and in the path of operation of the adhesive stamping pads 314 and 315.

After a body blank has been positioned upon a table plate 257 the Geneva gear 245 on the shaft 213 coacts with the Geneva gear 246 to rotate the bevel gear 249 and 250 and the hollow shaft 251 thereby causing the transfer wheel to be rotated through a third of a revolution to carry the centered body blank from station A, into station B, over the glue applying mechanisms.

The glue applying mechanisms are operated by the chain 283 causing the large feed roller 275 to carry glue upwardly with the wiping roller 281 acting to remove surplus glue from said supply roller. The adhesive applying roller 293 is normally held in resilient rolling contact with the supply roller 275 by the spring 306 and the action of the crank arm 308 and the connecting rod 305. A coating of glue is thus received by the glue applying roller 293 from the supply roller 275. The crank arm 308 at this time in the operation actuates the connecting rod 305 and the bell-crank arm 302 to rock the shaft 300 thereby causing the long bell-crank arms 299 to advance the roller 293 through a horizontal path controlled by the guide rods 296. The roller 293 is thus caused to roll over the stamping pads 314 and 315 to coat the same with a layer of glue, while the stamping plate 316 is in the full line position of Figure 26.

The control cam 323, at this stage in the operation, acting on the roller 322 (Figures 4 and 8) swings the lever 320 upwardly thereby raising the toggle bar 319 which in turn slides the plate 317 upwardly in its guides and thereby raises the stamping plate 316 into the dotted line position of Figure 26. The stamping pads 314 and 315 are thus elevated and stamp the under surface of the projecting margins 134 and 139 of the cup body blank with a curved strip and a straight strip of glue.

After a cup body blank 135 has been stamped with strips of glue the Geneva gears 245 and 246 again act to cause rotation of the hollow shaft 251 and the transfer wheel through a third of a revolution thereby carrying the glued cup body blank from station B, into station C.

The glued blank is now ready to be delivered to a forming mandrel 77. The control cam 271 on the shaft 213 now acts on the arm 269 causing rotation of the shaft 266 and the control cam 265. The cam 265 acting on the roller 264 causes the roller arm 261 and the spoke bracket 254 in station C, to be pivoted about the pin 260, thereby swinging the blank carrying table plate 257 toward the mandrel 77 so that the tab 141 of the cup body blank is projected into the recess 82 of the mandrel.

Referring to Figure 19, it will be noted that when the tab of the blank is projected into the mandrel recess 82, that the grippers 81 are moved into open position by the control cam 79 which is governed by the action of the gripper control cam 92. As soon as the tab 141 of a blank 135 has been projected into a mandrel recess 82 the spring 86 acts to retract the cam 79 permitting the gripper control springs 85 (Figure 16) to act automatically to close the grippers and clamp the tab within the recess of the mandrel. As soon as a blank has been gripped by the mandrel grippers 81 the spring 259 returns the table plate 257 into its normal radial position.

The turret wheel 68 is rotated with a variable speed controlled by the eccentric disks 190 and 194, thereby causing the gripped blank to be drawn off of the table plate 257. With the advance of the turret wheel, the mandrel 77, as it advances from station E, toward station F, is rotated by the bevel gear 76 co-acting with the large bevel gear 119. The gripper blank is thus wound around the mandrel and the pressing roll 117 controlled by its spring 118 acts to press the straight glued margin 139 of the body blank over the plain or un-glued margin 138 of the blank thereby partly forming the body of the cup. The ends of the cup body project beyond the ends of the mandrel as illustrated in Figure 22 and the tab 141 is positioned to the inside of the cup body still engaged by the grippers 81.

The mandrel carrying the cup bottom blank and the partly formed cup body blank, advances toward station F, and moves into the position shown in Figure 22 in alignment with the crimping plunger 159 with the reduced end of the cup body disposed adjacent the end of the deflecting sleeve 155. With the continued advance of the turret wheel the spared end 114 of the pin 112 (Figure 12) comes into engagement with the crank arm 126 thereby causing the segment bracket 122 to be gradually rocked or rotated from the full line position of Figure 11 toward the dotted line position against the action of the spring 129. The action of the spring 131 prevents tripping of the crank arm 126 during the advance of the segment bracket 122.

With the advance of the segment bracket 122 the roller 145 tracks over the stationary crimper control cam 146 (Figure 22) thereby tilting the lever 144 causing the pins 150 to move downwardly in the slots 151 and 157 to first slide the sleeve 155 from the position illustrated in Figure 22 into the position shown in Figure 23 so that the bevel seat 156 is moved into contact with the glued bottom margin 134 of the cup body. The bottom margin of the cup body is thus deflected inwardly into the path of movement of the crimping plunger 159. When the collar 161 comes into contact with the upper end of the casing 152, the movement of the deflecting sleeve 155 is stopped and the pins 150 continue their movement in the slots 151 and now cause operation of the plunger 159 with respect to the sleeve 155. The end of the plunger 159 is projected through the seat 156 of the deflecting sleeve and crimps the deflected glued margin 134 of the cup body over the flange 136 of the cup bottom 137 as illustrated in Figure 24.

As the roller 145 presses off of the crimper control cam 146 the compressed plunger spring 160 releases the plunger 159 and the tensioned spring 147 acts to raise the deflecting sleeve 155 out of engagement with the crimped bottom of the paper cup.

After a crimping operation the continued rotation of the turret wheel carries the partly formed cup toward the pressing or ironing station G, and the movement of the segment bracket 122 carries the crank arm 127 into engagement with the trip pin 128 (Figure 11) thereby causing the shaft 125 to be rocked allowing the crank arm 126 to swing outwardly permitting the squared tip 114 of the pin 112 to pass beneath the tripped crank arm 126. The tensioned spring 129, now acts to rotate the segment bracket 122 back into its normal position against the stop pin 130.

As the partly formed cup is carried toward station G, the segment bracket 122 is again advanced by the next pin 112 and the crimped end of the cup is moved into register with the ironing disk 175 (Figure 10). When the roller 163 comes into contact with the stationary cam 162 the bell-crank 164—165 is operated thereby causing the auxiliary bell-cranks 171 and the arms 172 to move downwardly so that the ironing disk 175 seats in the flanged crimped bottom of the cup, while the flange 176 acts to move the ironing roller 169 adjacent the exterior portion of the bottom portion of the cup. The rotation of the mandrel 77 carrying the cup causes rotation of the ironing disk 175 and the ironing roller 169 which act on the crimped bottom rim of the cup and iron or press the same into a finished form during the time the segment bracket 122 advances carrying the roller 163 over the control cam 162. When the roller 163 passes the cam 162 the spring 177 acts automatically to move the ironing disk 175 and the ironing roller 169 out of engagement with the bottom end of the cup.

The continued rotation of the turret wheel now carries the ironed cup toward station H, bringing the roller 107 into engagement with the stationary rim forming control cam 108 (Figures 14 and 15). The cam 108 acts to operate the arm 105 thereby causing the forked arm 104 to swing toward the enlarged end of the mandrel 77. The rim shaping plate or disk 102 is thus moved into engagement with the upper margin 140 of the cup causing said upper margin to engage in the groove 103 and be curled outwardly and downwardly to form a curled rounded rim on the cup as illustrated in Figure 31. The rim shaping plate 102 is retracted by its control spring when the roller 107 passes off of the cam 108.

This completes the forming of the flat bottomed cup which is now carried by the rotating turret wheel from station H, toward the cup discharge station J. As the mandrel 77 carrying the finished cup advances toward station J, the roller 110 on the presser roll control arm 111, rides over the stationary control cam 109 (Figure 14), thereby causing the pin 112 to be rocked to swing the presser roller 117 away from the mandrel 77 and the cup carried thereon.

At this stage in the operation the roller 91 co-acting with the cam 92 slides the cam 79 outwardly into co-acting relation with the trip lug 80 of the grippers 81 so that with the rotation of the mandrel the cam 79 causes the grippers 81 to release their hold on the tab 141 of the formed cup. When the cup is released by the grippers the roller 96 riding over the discharge control cam 95 causes the ejector rod 98 to slide outwardly in the mandrel 77 thereby compressing the spring 100 and moving the plunger head 99 into the projected position illustrated in Figure 16. This operation of the plunger head 99 loosens the cup on the mandrel.

With the loosening of the completed cup, the cam 328 co-acting with the roller 329 opens the air pressure valve 327 thereby causing a discharge of compressed air from the air supply pipe 326 to flow through the passaged ejector rod 98 to strike against the interior of the loosened cup to blow the cup from the mandrel. With the advance of the mandrel the bracket 97 moves out of engagement with the air valve bracket 324 and the roller 96 reaches a depression in the control cam 95 thereby permitting the spring 100 to seat the plunger head 99 in the mandrel.

It will be noted that the improved rotary flat bottom cup machine of this invention is adapted to manufacture flat bottomed paper cups out of cup bottom and cup body blanks, and that the body blanks are supplied with strips of adhesive before being delivered to the forming mandrels to which the cup bottoms are also fed. The blanks are successively carried through the various stations D, E, F, G, H and J, in each of which a different function is performed in the completion of a cup. A plurality of cups are simultaneously under process of construction, and a completed cup is discharged at each sixth of a revolution of the turret wheel.

I am aware that numerous details of construction may be varied through a wide range without departing from the principles of this invention, and I therefore do not purpose limiting the patent granted hereon, otherwise than necessitated by the prior art.

I claim as my invention:

1. A cup forming machine comprising in combination, a rotatable turret wheel, a plurality of mandrels rotatably mounted thereon, grippers in said mandrels, means for rotating said turret wheel and said mandrels, mechanisms operated from the machine for punching out, shaping and delivering cup bottom blanks into the ends of said mandrels, a rotatable blank transfer wheel, a cup body blank magazine, feed means for feeding cup body blanks from said magazine to said transfer wheel, a gluing device for applying strips of glue to the cup body blanks carried by said transfer wheel, means forming a part of said transfer wheel for delivering cup body blanks to said mandrel to be gripped by said grippers, mechanisms in the path of travel of said turret wheel acting to roll and crimp the glued body blanks around the bottom blanks on said mandrels to form cups, means also disposed in the path of travel of said turret wheel adapted to iron the crimped portions of the cups, means for releasing the grippers, and mechanisms carried by the mandrels for pushing the cups from the mandrels.

2. A cup forming machine comprising in combination a rotatable turret wheel, means for driving the same, mandrels rotatably mounted on said turret wheel, means for delivering flanged cup bottoms to said mandrels, gripping means within said mandrels, means within the mandrels for operating said gripping means, a rotatable transfer wheel for delivering blanks to said mandrels to be engaged by said gripping means and means disposed in the path of rotation of said turret wheel for forming the blanks around said flanged cup bottoms to form completed cups.

3. A cup forming machine comprising a turret wheel, means for driving the same, mandrels rotatable on said turret wheel and operable by said driving means, gripping means for blanks associated with said mandrels, mechanisms for delivering cup bottoms to the ends of said mandrels, a rotatable blank transfer wheel, means for intermittently rotating the same through the path of rotation of said turret wheel, blank supporting tables forming part of said transfer wheel adapted to be rocked at predetermined times to deliver body blanks to said mandrels, mechanisms in said mandrels for actuating said gripping means to cause the same to grip the blanks delivered to said mandrels, and mechanisms positioned in the path of rotation of said turret wheel adapted to coact with said mandrels to form the gripped body blanks around said cup bottoms to form cups.

4. A cup making machine comprising a vertically rotatable turret wheel, a rotatable blank transfer wheel positioned to cut across the plane of rotation of said turret wheel, driving means for operating said wheel, rotatable mandrels carried by said turret wheel, pressing rollers carried by said turret wheel and co-acting with said mandrels, mechanisms for delivering cup bottoms to the ends of said mandrels, radially extending blank carrying tables forming a part of said transfer wheel, feed means for feeding blanks onto said tables, mechanisms for rocking said tables at predetermined times to deliver blanks to said mandrels means operated by said driving means for rotating the mandrels to cause the blanks to be formed around the mandrels, and cup finishing mechanisms adapted to coact with said mandrels to finish the forming of said blanks around said cup bottoms to form flat bottomed cups.

5. A cup making machine comprising a turret wheel, means for continuously rotating the same, rotatable mandrels carried by said turret wheel, mechanisms for punching and forming cup bottoms and delivering the same into the ends of said mandrels, a rotatable spider, mechanisms for intermittently rotating said spider, blank transfer tables pivotally supported on said spider, a body blank feed device for delivering body blanks onto said tables, means on said spider for individually causing said tables to deliver a body blank to a mandrel when in loading position, means for rotating the mandrels to cause the body blanks to be wound around the mandrels, a support, blank forming and ironing mechanisms supported on said support, means for operating said forming and ironing mechanisms to cause the body blanks to be formed over the cup bottoms and then ironed to complete the forming of cups, and ejecting mechanisms in each mandrel adapted to first loosen a formed cup and then discharge the cup off of the mandrel.

6. A cup making machine comprising a rotatable turret wheel, mandrels rotatably mounted thereon, means for delivering cup bottoms into the ends of said mandrels, a rotatable transfer wheel for delivering glued blanks to said mandrels, grippers in said mandrels for gripping the blanks delivered thereto, shiftable and rotatable cams within the mandrels for operating the grippers, means for rotating the turret wheel and said mandrels to form the glued blanks around the mandrels, mechanisms for crimping and pressing the blanks around said cup bottoms to form cups, and plunger means within said mandrels for discharging the cups.

7. A cup forming machine comprising a rotatable turret wheel, mandrels and presser rolls carried by the turret wheel, mechanisms for delivering cup bottoms and cup body blanks to said mandrels, mechanisms adapted to advance with the turret wheel to coact with said mandrels to form the body blanks around the cup bottoms to form cups, stationary members for controlling the operation of said mechanisms, and means for discharging the cups from said mandrels.

8. In a machine of the character described, a bottom blank punching and forming mechanism, a chambered mandrel, a body blank support, mechanisms for feeding a bottom blank into one end of the mandrel and a body blank from said support to the side of the mandrel, gripping means in said mandrel adapted to grip the advance edge of the body blank, and means for automatically releasing the gripping means at a predetermined time.

9. In a machine for making cups the combination with a mandrel having a recess in one end thereof, of a bottom blank punching mechanism, a body blank holder, mechanisms for pushing a bottom blank into said recess, rotatable transfer means for delivering a body blank from said holder to the side of said mandrel, grippers adapted to grip said body blank while it is being formed around the bottom blank to form a cup, and means for releasing the grippers after a cup has been formed.

10. In a cup machine the combination with a chambered mandrel having a recess in one end thereof, of a bottom blank punching, shaping and feed means, a body blank feed device, mechanisms for operating the feed means to seat a bottom blank in said mandrel recess, intermittently operated means for feeding a body blank to the side of said mandrel, grippers in said mandrel for gripping the body blank, means for releasing the grippers after a cup has been formed out of said bottom blank and said body blank, and means for loosening the formed cup on said mandrel to facilitate discharge of the cup.

11. In a cup making machine the combination with mandrel having a recess in one end thereof, of a bottom blank punching, flanging and feed means adapted to push a flanged bottom blank into said recess, an intermittently rotatable body blank feed table, means for pivoting said table at a predetermined time, to deliver a body blank to the side of said mandrel, and gripping means associated with said mandrel for gripping the body blank to permit the body blank to be formed around said flanged bottom blank to form a cup.

12. The combination with a mandrel having a recess in one end thereof, of a bottom blank cutting and forming device adapted to seat a flanged bottom blank in said recess, intermittently rotatable feed means adapted to feed a body blank to the side of the mandrel, grippers in said mandrel adapted to grip one margin of said body blank, means for rotating and translating the mandrel to cause the body blank to be formed around the bottom blank to form a cup, means for loosening the cup on said mandrel, and mechanisms for forcing the loosened cup off of the mandrel.

13. The combination with a mandrel, of a bottom blank punching and forming device adapted to seat a bottom blank in one end of the mandrel, a gluing device, a body blank holding magazine, a rotatable transfer device, a table forming a part thereof adapted to transfer a body blank from the magazine to said gluing device and then deliver the glued body blank to said mandrel, grippers in said mandrel adapted to grip the body blank to remove the same from said table, means for forming the body blank around said bottom blank to form a cup, means for releasing the grippers, and devices for loosening the cup and discharging the same from said mandrel.

14. The combination with a mandrel, of mechanisms for forming and applying a cup bottom blank into one end of said mandrel, a body blank magazine, a gluing mechanism, an intermittently rotatable transfer wheel, a pivoted table forming a part thereof adapted to carry a body blank from the magazine to said gluing mechanism and then to said mandrel, and means for rocking the table when said wheel is stationary to cause the body blank to be projected toward the mandrel.

15. The combination with a mandrel, of means for punching out a cup bottom blank and seating the same in one end of the mandrel, a body blank magazine, a gluing device, a rotatable transfer wheel, blank carriers thereon, means for feeding a body blank from the magazine onto one of said blank carriers to permit the body blank to be carried to said gluing device and then to said mandrel, and means for operating a blank carrier with respect to said transfer wheel to cause the glued body blank to be delivered to said mandrel.

16. The combination with a mandrel having a recess in one end thereof, of grippers in said mandrel, mechanisms for seating a cup bottom blank in said recess, intermittently rotatable rocker means, means for operating the same to cause a body blank to be delivered to the mandrel to be gripped by said grippers, and means co-acting with the mandrel for forming a body blank around said bottom blank to form a cup.

17. In a cup making machine the combination with a rotatable mandrel having a recess in one end, of a swingable punch mechanism, means for feeding a material through the punch mechanism, means for swinging the punch mechanism into alignment with said mandrel, mechanisms for operating the punch mechanism to cause a cup bottom blank to be punched from the material, and then pushed into the mandrel recess.

18. In a cup making machine the combination with a mandrel having a recess in one end thereof, of a pivoted punch mechanism, means for feeding a material a predetermined distance through the punch mechanism, means for swinging the punch mechanism into alignment with the mandrel, means for operating the punch mechanism to cause a cup bottom blank to be punched out of the material, and means for flanging the margin of a cup bottom blank and pushing said flanged blank to seat in the recess in the mandrel.

19. In a machine of the class described, the combination with a turret wheel radially carrying a plurality of rotatable recessed frustum shaped mandrels translatable in an endless path, mechanisms for seating a bottom blank within a recessed mandrel and delivering a glued body blank to the side of said mandrel, means for rotating the mandrel, a pivoted presser traveling with said mandrel to form the body blank around said mandrel, translatable mechanisms for forming one end of the body blank around the margin of the bottom blank, translatable means co-acting with the mandrel for pressing the formed blanks to complete a cup, means for releasing the pivoted presser, and mechanisms within the mandrel for pushing the cup off of the mandrel.

20. In a cup forming machine of the class described, the combination with a plurality of radially directed rotatable mandrels translatable through an endless path, mechanisms for seating a bottom blank in one end of a mandrel and delivering a body blank to the side of said mandrel, grippers in each mandrel for gripping a body blank fed thereto, means for continuously rotating said mandrels and translating the same, translatable pressers acting on one of said blanks to cause the same to be coiled around the other blank on said mandrel to partially form a cup, a translatable crimping mechanism acting to crimp the body blank around a margin of the bottom blank, a translatable ironing mechanism adapted to finish the crimped bottom portion of the cup, a passaged pusher in each mandrel for loosening the cup thereon, and means for admitting compressed air in said passaged pusher to blow the loosened cup off of the mandrel.

21. In a cup forming machine of the class described, the combination with a continuously rotatable turret wheel, of a plurality of radially directed mandrels rotatably mounted therein, means for continuously rotating the turret wheel and the mandrels thereon, means for feeding a bottom blank and a body blank to a mandrel, a rotatable presser pivoted on the turret wheel and acting on the body blank to cause the same to be coiled around the bottom blank, a crimper mechanism translatable with the turret wheel acting to crimp one margin of the body blank around a margin of the bottom blank, an ironing mechanism translatable with the turret wheel for ironing out the crimped portion of the blanks to complete a cup, means for loosening the cup on said mandrel, and pneumatic means connected with the mandrel for blowing the loosened cup therefrom.

22. In a cup forming machine the combination with a continuously rotatable turret wheel, rotatable mandrels projecting radially therefrom, mechanisms for continuously rotating the turret wheel and the mandrels thereon, means for feeding a bottom blank and a body blank to a mandrel, a rotatable presser connected with the turret wheel and acting on the body blank to cause the same to be coiled around the bottom blank, a forming mechanism translatable with the turret wheel acting to form one margin of the body blank around a margin of the bottom blank, means for controlling the operation of said forming mechanism, an ironing mechanism translatable with the turret wheel for ironing the formed portion of the blanks to complete a cup, a means for controlling the operation of said ironing mechanism, means in said mandrel for loosening the cup, and pneumatic means connected with said latter means for blowing the loosened cup from the mandrel.

23. In a cup forming machine the combination with a rotatable turret wheel, of means for operating the same, rotatable forming mandrels radially supported on said turret wheel, a plurality of oscillatory spring controlled pressers rotatable with the turret wheel and adapted to resiliently contact said mandrels, means for moving said pressers out of engagement with said mandrels, means for seating flanged cup bottoms in the ends of said mandrels, and mechanisms for delivering body blanks to said mandrels to be formed around said cup bottoms by said mandrels and pressers.

24. In a cup making machine the combination with a turret wheel, means for driving the same at a variable speed, and forming mandrels rotatably supported radially on said turret wheel and each comprising a conical frustum shaped body having a cup bottom receiving recess in one end thereof and gripping means seated in the circumferential surface thereof.

25. In a machine of the class described, the combination with a recessed mandrel mounted for rotation and for translation from one station to another in an arcuate path, means for advancing said mandrel with a variable speed, means for seating a cup bottom blank in the recess of said mandrel, a presser translatable with the mandrel, means adapted to deliver a body blank to the mandrel, mechanisms adapted to continuously rotate the mandrel to cause the presser to coil the body blank around the mandrel and the cup bottom blank seated therein, mechanisms translatable with the mandrel for forming and pressing the cup body blank around the cup bottom blank to form a cup, and means for forming a rolled edge on the cup.

26. In a machine of the class described, the combination with a recessed mandrel mounted for rotation and for translation from one station to another in an arcuate path, means for advancing said mandrel with a variable speed, means for seating a cup bottom blank in the recess of said mandrel, a presser translatable with the mandrel, means adapted to deliver a body blank to the mandrel, mechanisms adapted to continuously rotate the mandrel to cause the presser and mandrel to form the body blank around the mandrel, translatable mechanisms movable through a part of the path of said mandrel and adapted to crimp and press the body blank around the cup bottom blank to form a cup, means for curling the edge of the cup, and means slidable through the mandrel for discharging the completed cup.

27. In a cup making machine of the class described, the combination with a rotatable turret wheel, means for continuously rotating the same at a variable speed, a plurality of mandrels rotatably supported thereon and provided with end recesses for receiving blanks seated therein, pressers associated with said mandrels and movable therewith through different stations of translation of the mandrels, and means for releasing the pressers at predetermined times.

28. In a machine of the class described, the combination with a plurality of translatable and rotatable mandrels each having a recess in one end and an opening in the side thereof, a plunger mechanism in each mandrel operable through said recess, gripping means in each mandrel opening, means for seating a bottom blank in a mandrel recess against the plunger, feed means for delivering a body blank to a mandrel to be gripped by said gripping means, driving means for operating the mandrels to cause the body blank carried by a mandrel to be formed around the mandrel, mechanisms translatable through an arc shaped path adapted to form and press the body blank around the bottom blank to form a cup, and means for actuating the plunger to cause the finished cup to be loosened on the mandrel.

29. In a machine of the class described, the combination with a translatable mandrel, of a presser co-acting and translatable with the mandrel, a punch mechanism adapted to deliver a bottom blank into one end of the mandrel, a rotatable support, and a rocker table pivotally mounted thereon adapted to feed a body blank to the side of said mandrel.

30. In a machine of the character described, the combination with a plurality of continuously translatable mandrels having recesses therein, mechanisms for successively seating a bottom blank in one of the recesses of a mandrel and feeding a body blank partly into another recess of said mandrel, gripping means in one of the recesses of each mandrel for holding the body blank, means for gluing the body blank previous to feeding the same to the mandrel, a presser co-acting with each mandrel, and a plurality of translatable mechanisms for crimping and pressing the glued body blank around the seated bottom blank to form a cup.

31. In an apparatus of the character described, the combination with a mandrel, means for continuously translating said mandrel at a variable speed in an endless path, said mandrel having a recess therein, mechanisms for seating a cup blank in said recess, gripping means associated with the mandrel for engaging a glued cup blank, mechanisms for rotating and translating the mandrel whereby the glued cup blank is coiled around the mandrel and around the cup blank seated therein, a presser translatable with the mandrel to press the glued blank against the mandrel, and means for releasing the presser at a predetermined time.

32. In a machine of the class described, the combination with a rotatable and translatable mandrel, means for seating a cup bottom blank therein, means for coiling a cup body blank around the mandrel and the cup bottom blank seated therein, successively acting translatable mechanisms for forming a portion of the body blank over said bottom blank to form a cup, a cup discharge means associated with said mandrel, and means for operating said discharge means at a predetermined time to cause the cup to be removed from the mandrel.

33. In a cup forming machine the combination with a plurality of rotatable mandrels continuously translatable at a variable speed through an endless path, mechanisms for feeding a bottom blank and a body blank to a mandrel at different stations of translation, means for gripping the body blank to the mandrel, means for continuously rotating the mandrel, a presser acting on the body blank to cause the same to be coiled around the mandrel, a translatable crimper mechanism acting to crimp the body blank around a margin of the bottom blank, a translatable ironing mechanism acting to press the crimped portion of the body blank, means traveling with the mandrel adapted to be actuated at a predetermined time to roll a margin of the body blank to form a rim, and mechanisms carried in the mandrel for discharging the completed cup.

34. In a cup making machine the combination with a rotatable and translatable mandrel having a recess in one end, means for punching, forming and then seating a bottom blank in said recess, a plurality of feed mechanisms to feed a body blank to the side of the mandrel, means for applying adhesive to the body blank during the feeding of said body blank, and translatable mechanisms acting in sequence to crimp and press the body blank around the bottom blank.

35. In a cup making machine the combination with a mandrel, of means for seating a flanged bottom blank in one end of the mandrel, mechanisms for applying a glued body blank to the side of the mandrel, a presser co-acting with the mandrel, means for rotating the mandrel and presser to cause the glued body blank to be formed around the mandrel and the flanged bottom blank, a traveling crimper adapted to bend a glued margin of the body blank around the flange of said bottom blank, a traveling ironing mechanism for pressing the crimped portions of the body blank against the bottom blank flange, a rim forming means associated with the mandrel, and means for actuating the same to cause a margin of the body blank to be formed into a rim to complete the cup.

36. In a cup making machine the combination with a rotatable and traveling mandrel, of mechanisms for applying cup blanks in the end and to the side thereof, a rotatable traveling presser co-acting with the mandrel, mechanisms for rotating and advancing said mandrel and presser to cause one of said blanks to be formed around the other, traveling crimper and forming mechanisms, means for actuating the same to finish the forming of said blanks into a cup, means traveling with the mandrel adapted to curl the drinking margin of the cup, and consecutively acting mechanisms in the mandrel adapted to loosen and then discharge the cup from the mandrel.

37. In a cup making machine the combination with a continuously rotating and traveling blank carrying mandrel, of a rotatable presser traveling and co-acting therewith, a support, means for rocking the same, and a crimper mechanism on said support to travel with the mandrel and coact therewith to crimp one blank around another.

38. In a cup making machine the combination with a blank carrying mandrel, a presser co-acting therewith, means for rotating and translating the mandrel and presser, a reciprocating member to be advanced with the mandrel, and mechanisms supported on said member to crimp and press a margin of one blank around a margin of another blank carried by the mandrel to form a cup.

39. In a cup forming machine the combination with a mandrel adapted to carry a plurality of blanks, of a presser co-acting therewith, means for rotating and translating said mandrel and presser, a support adapted to be advanced by the mandrel, crimping and ironing mechanisms mounted on said support, and stationary means adapted to operate said mechanisms to cause a margin of one blank to be crimped and ironed over a margin of another blank to form a cup.

40. In a cup forming machine the combination with a mandrel adapted to carry a pair of cup blanks, of a presser co-acting therewith, means for rotating and translating said mandrel and presser, a supporting means arranged to be advanced by the mandrel through a predetermined distance, crimping and ironing mechanisms mounted on said supporting means, means positioned in the path of said crimping and ironing mechanisms to operate the same in sequence to cause a margin of one blank to be crimped and ironed over a margin of the other blank to form a cup, and a forming member to coact with the mandrel to cause a margin of the cup to be curled to form a drinking rim.

41. In a cup making machine the combination with a blank carrying translatable mandrel, of a member translatable therewith, a pivoted support adapted to be advanced by said member, a deflecting sleeve slidably mounted on said support, a spring controlled plunger slidable therein; a lever connected with said sleeve and plunger, and means to actuate said lever to cause the sleeve to first deflect a margin of a blank carried on the mandrel and then to cause the plunger to crimp said deflected margin.

42. The combination with a translatable blank carrying mandrel, of a reciprocating bracket, means for intermittently advancing and returning the same, a translatable crimping mechanism on said bracket, and means for operating the crimping mechanism to crimp a margin of one blank around a margin of another blank.

43. The combination with a translatable blank carrying mandrel, of a pivoted support, means for periodically reciprocating the same, a translatable ironing mechanism on said support, and means for operating the ironing mechanism to iron the crimped margin of one blank over a margin of another blank.

44. The combination with a translatable blank carrying mandrel, of means translatable therewith, a translatable support adapted to be advanced by said means, crimping and forming mechanisms carried on said support, and stationary means for operating said mechanisms.

45. The combination with a translatable device, a projecting member thereon, a blank carrying mandrel on said device, a pivoted support adapted to be rocked by the advancement of said member, crimping and ironing devices supported on said support to coact with the advancing mandrel, and cam means for actuating said crimping and ironing devices to cause a margin of one blank to be crimped and pressed over a margin of another blank.

46. The combination with a translatable wheel, a pin projecting therefrom, a blank carrying mandrel on said wheel, a spring controlled pivoted support adapted to be advanced by said pin through a predetermined distance, crimping and ironing mechanisms mounted on said support to co-act with the mandrel to crimp and iron blanks carried by said mandrel, and stationary cams for actuating said crimping and ironing mechanisms.

47. The combination with a translatable member, a pin projecting therefrom, a blank carrying mandrel on said member, a spring controlled pivoted support, a spring controlled crank mechanism thereon adapted to be engaged by the pin to cause said support to be advanced through a certain distance by said mandrel, crimping and ironing devices on said support, stationary cams for operating said devices to cause crimping and ironing of the blanks by the mandrel, and means for tripping said crank mechanism to permit the support to return to normal position.

48. The combination with a blank carrying mandrel, of a rotatable support therefor, a projection on said support, translatable crimping and ironing devices, means adapted to be engaged by said projection to cause said devices to be advanced with said mandrel mechanism, and a stop member adapted to release said means at a predetermined time to permit the crimping and ironing devices to be returned to their normal positions.

49. In a cup making machine the combination with a mandrel recessed to receive a bottom blank seated therein, a shaft journalled in said mandrel, spring controlled grippers on said shaft, for gripping a body blank thereto, telescoping members, means for actuating the same to cause a margin of the body blank to be crimped around a margin of said bottom blank, and a stationary cam for controlling the operation of said actuating means.

50. The combination with a rotatable turret wheel, of a cup forming mandrel thereon carrying a cup having a flanged base portion, a pivoted reciprocating support, a plurality of pressers thereon, a spring controlled crank mechanism on said support, a member carried by the turret wheel coacting with crank mechanism for advancing the support with the mandrel, and stationary means for moving the pressers into engagement with the flanged base portion of the cup to press and complete the same.

51. In a cup making machine the combination with a rotatable and translatable frustum shaped mandrel having a recess in the smaller end thereof, of a plunger slidably mounted within the mandrel, means for seating a bottom blank in said recess against the plunger, and means for actuating said plunger to cause discharge of the blank from said recess.

52. In a cup making machine the combination with a rotatable mandrel, of a rotatable supporting means for carrying the mandrel through a plurality of stations, means for seating a bottom blank in one end of the mandrel at one station, mechanisms for feeding a body blank to the mandrel at another station, crimping mechanisms at another station adapted to advance with the mandrel for crimping the body blank over the bottom blank, ironing means at another station adapted to advance with the mandrel to press and iron the crimped portions of the blanks, curling means at another station adapted to coact with the mandrel to curl the drinking margin of the formed cup, and means carried in the mandrel adapted to operate at another station to move the finished cup off of the mandrel.

53. In a cup making machine the combination with a rotatable turret wheel, of a plurality of mandrels rotatably mounted thereon, a bottom blank feed co-acting with one of said mandrels, a body blank feed co-acting with a mandrel in another position, a blank crimping mechanism co-acting with a mandrel in still another position, a blank ironing device co-acting with a mandrel in another position, a blank edge curling mechanism co-acting with a mandrel in still another position, and cup removing means arranged to co-operate with a mandrel in another position.

54. In a cup making machine the combination with a rotatable turret wheel, of a rotatable mandrel radially mounted thereon, a pivoted blank punch mechanism, a pivoted lever arm, a link connecting said lever arm with said punch mechanism, and cam means for operating said lever arm and link to swing said punch mechanism into alignment with the mandrel when the mandrel reaches a predetermined position in its path of translation.

55. In a cup making machine the combination with a rotatable turret wheel, of a mandrel mounted thereon, a cup bottom blank forming and feeding mechanism adapted to be moved into co-acting relation with the advancing mandrel to deliver a bottom blank into the outer end of said mandrel, and body blank feeding and forming mechanisms distributed around the turret wheel to feed and form a cup body blank around the bottom blank to form a cup.

56. In a cup forming machine the combination with a turret wheel continuously rotating at a variable speed, of a recessed rotatable mandrel carried thereon, a cup bottom blank punching and forming mechanism mounted in the plane of the turret wheel, means for feeding a material through the punching and forming mechanism, and means for operating and moving the punching and forming mechanism into alignment with the mandrel at a predetermined position on its path of movement.

57. In a cup making machine the combination with a recessed mandrel, of means for rotating the same and translating the mandrel at a variable speed, and blank punching and forming means adapted to be advanced into a position of alignment with the advancing mandrel to permit a blank to be punched, formed and seated in said recessed mandrel.

58. In a cup forming machine the combination with a rotatable mandrel carrying turret wheel, of blank crimping and ironing mechanism, a common support therefor, and means on the turret wheel to engage the support to cause the crimping and ironing mechanisms to be simultaneously advanced in registering relation with a plurality of mandrels on said turret wheel.

59. The combination with a translatable variable speed blank-carrying mandrel, of translatable cup finishing mechanisms adapted to travel in aligned cooperating relation with said mandrel to form blanks carried thereby into a cup.

In testimony whereof I have hereunto subscribed my name.

CESARE BARBIERI.